US006896804B2

(12) United States Patent
Haerther et al.

(10) Patent No.: US 6,896,804 B2
(45) Date of Patent: May 24, 2005

(54) SYSTEM AND METHOD FOR REMEDIATION OF WASTE

(75) Inventors: Daryl W. Haerther, Strasburg, CO (US); Donald Ian Rosebrook, Englewood, CO (US); Loren L. Losh, Strasburg, CO (US)

(73) Assignee: Agsmart, Inc., Strasburg, CO (US)

( * ) Notice: Subject to any disclaimer, the term of this patent is extended or adjusted under 35 U.S.C. 154(b) by 16 days.

(21) Appl. No.: 10/430,934

(22) Filed: May 6, 2003

(65) Prior Publication Data

US 2003/0213745 A1 Nov. 20, 2003

Related U.S. Application Data

(63) Continuation-in-part of application No. 10/158,562, filed on May 29, 2002, now abandoned.
(60) Provisional application No. 60/378,754, filed on May 7, 2002, now abandoned.

(51) Int. Cl.[7] .................................................. C02F 3/32
(52) U.S. Cl. ...................... 210/602; 210/614; 210/620; 47/1.4; 47/17
(58) Field of Search ............................... 210/602, 604, 210/612, 614, 620, 143, 149, 170; 47/1.4, 17, 905; 435/262, 262.5

(56) References Cited

U.S. PATENT DOCUMENTS

| | | | |
|---|---|---|---|
| 3,768,200 A | * 10/1973 | Klock | 47/1.4 |
| 3,882,635 A | 5/1975 | Yamanaka et al. | 47/1.4 |
| 3,955,318 A | 5/1976 | Hulls | 47/1.4 |
| 4,005,546 A | 2/1977 | Oswald | 47/1.4 |
| 4,209,388 A | 6/1980 | DeFraites | 210/8 |

(Continued)

OTHER PUBLICATIONS

Baumgarten et al., *Appl Microbiol Biotechnol*; 52(2):281–284 (1999).
Chan et al., *Biomed Environ Sci*; 4(3):250–261 1991.
Chrost et al., *Acta Microbiol Pol B*; 7(4):231–236 1975.
Hammouda et al., *Ecotoxicol Environ Sat*, 31(3):205–210 1995.
Matusiak, *Acta Microbiol Pol*; 25(3):233–242 1976.
Matusiak et al., *Acta Microbiol Pol*; 26(1):79–93 1977.
Miernik, *Acta Microbiol Pol*; 32(3):269–274 1983.
Miner et al., "Managing Livestock Wastes to Preserve Environmental Quality"; *Iowa State University Press*; 2000; pp. 170–186.
"Aeration"; *Water Environment Federation and American Society of Civil Engineers*; 1988; pp. 1–167.

*Primary Examiner*—Fred G. Prince
(74) *Attorney, Agent, or Firm*—Sheridan Ross P.C.

(57) ABSTRACT

A system and method are provided for aerobic treatment of waste, such as animal or human waste. The method includes the continual introduction of microalgae. The high amounts of oxygen produced by the microalgae satisfies the biochemical oxygen demand in the treatment process and also allows oxidation of undesirable contaminants. Delivery of the microalgae at a desired rate is achieved by incorporation of a series of electrical and mechanical devices housed within a greenhouse type structure which optimizes growth conditions for the microalgae, and also allows the system to be automated.

50 Claims, 5 Drawing Sheets

U.S. PATENT DOCUMENTS

| | | | | |
|---|---|---|---|---|
| 4,267,038 | A | 5/1981 | Thompson | 210/602 |
| 4,316,961 | A | 2/1982 | Klass et al. | 435/167 |
| 4,432,869 | A | 2/1984 | Groeneweg et al. | 210/602 |
| 4,966,713 | A | 10/1990 | Keys et al. | 210/705 |
| 5,277,814 | A | 1/1994 | Winter et al. | 210/604 |
| 5,447,850 | A | 9/1995 | McCann | 435/42 |
| 5,472,472 | A | 12/1995 | Northrop | 71/9 |
| 5,622,864 | A | 4/1997 | Buchanan | 435/290.1 |
| 5,627,069 | A | 5/1997 | Powlen | 435/267 |
| 5,716,523 | A | 2/1998 | Powlen | 210/611 |
| 5,744,041 | A | 4/1998 | Grove | 210/602 |
| 5,755,852 | A | 5/1998 | Northrop | 71/9 |
| 5,904,851 | A | 5/1999 | Taylor et al. | 210/620 |
| 6,040,498 | A | 3/2000 | Stomp et al. | 800/294 |
| 6,121,038 | A | 9/2000 | Kirschner | 435/262 |
| 6,146,507 | A | 11/2000 | Gustafson | 204/275.1 |
| 6,214,617 | B1 | 4/2001 | Herman | 435/394 |
| 6,267,888 | B1 | 7/2001 | Satyanarayana | 210/610 |
| 6,277,279 | B1 | 8/2001 | Hruza | 210/610 |
| 6,281,001 | B1 | 8/2001 | McNelly | 435/262 |
| 6,325,934 | B1 | 12/2001 | Tobey, Jr. et al. | 210/606 |
| 6,329,196 | B1 | 12/2001 | Johnson et al. | 435/299.1 |
| 6,350,350 | B1 | 2/2002 | Jensen et al. | 162/141 |
| 6,416,993 | B1 * | 7/2002 | Wexler et al. | 435/262.5 |

* cited by examiner

Fig_3

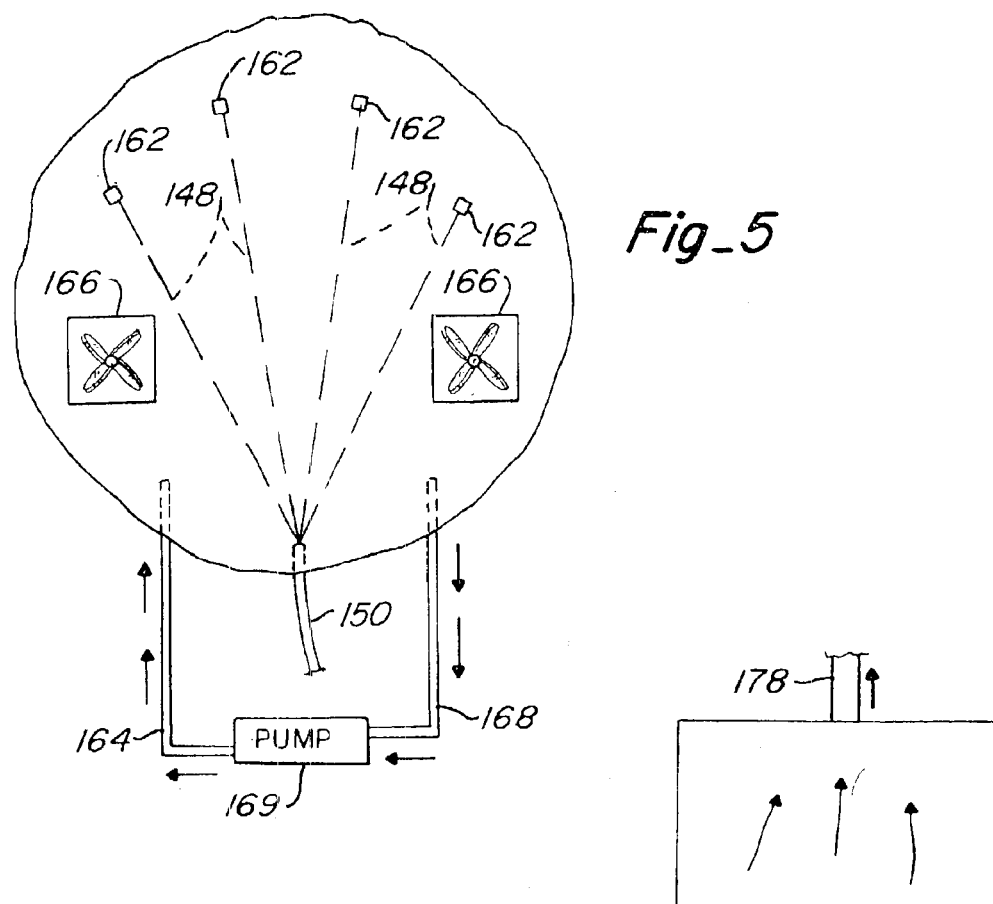
*Fig_5*
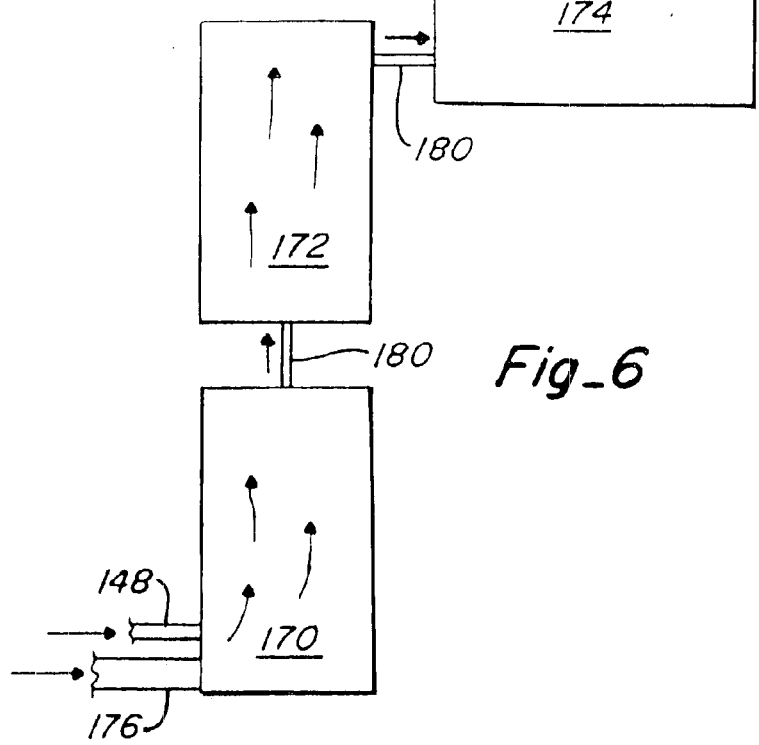
*Fig_6*

SYSTEM AND METHOD FOR REMEDIATION OF WASTE

CROSS-REFERENCE TO RELATED APPLICATIONS

This application is a continuation-in-part of U.S. patent application Ser. No. 10/158,562 filed May 29, 2002, now abandoned and entitled "System and Method for Remediation of Waste", which claims the benefit of priority under 35 U.S.C. § 119(e) from U.S. Provisional Application Ser. No. 60/378,754 by Haerther et al., filed May 7, 2002, now abandoned and entitled "System and Method for Remediation of Waste".

FIELD OF THE INVENTION

This invention relates to a system and method for remediating waste, and more particularly, to a system and method for the aerobic bio-degradation of animal and human waste stored in waste ponds and other similar facilities.

BACKGROUND OF THE INVENTION

The last decade has witnessed a change in the production of livestock and dairy products from small, family owned units, to large corporate owned farms. As a direct result of this evolution, large wastewater ponds have been constructed to consolidate waste handling and remediation. However, the increased production of these large farms has also resulted in increased waste which directly impacts air and water quality in the surrounding area.

Because of economic constraints, livestock production units typically utilize large anaerobic earthen or concrete storage basins. These large basins ponds can be sources of air and water pollution. Anaerobic decomposition produces carbon dioxide, methane, (one of the greenhouse gases); hydrogen sulfide, (of concern because of its toxicity and odor); and ammonia. The smell of nearby manure decomposition is particularly offensive, and has created concerns throughout the livestock and dairy industry.

The impact of an organic waste discharged into a stream, lake, or underground aquifer can be predicted by the measurement of dissolved oxygen (DO), ammonia nitrogen (NH3-N), and biological chemical oxygen demand (BOD) in the waste water source. Livestock waste streams typically have BOD concentrations in excess of 5000 mg/L compared with approximately 200 mg/L for municipal wastewater. The high BOD levels of livestock waste prohibit any discharge into receiving streams by livestock and dairy production units. Municipalities are regulated by state and federal permit standards as to the BOD TSS and NH3-N limits allowed to be discharged into receiving streams. Liquid manure tends to have the majority of its nitrogen in the ammonia form (NH3-N).

In anaerobic storage and decomposition, organic nitrogen is continually being converted to ammonia and a portion of the ammonia is volatilized and therefore lost to the atmosphere, contributing to both odor and to nitrogen enrichment of surface waters. Excess ammonia levels in water presents health problems for humans as well as animals by reducing the oxygen carrying capacity of blood. If ground water becomes contaminated, it is likely that several years will be required for the aquifer to recover.

Federal secondary effluent criteria for publicly owned treatment facilities do not include dissolved oxygen minimums. Yet, there are local discharge requirements that specify a minimum DO concentration ranging from 2 to 8 mg/L, depending on surrounding stream requirements. Generally, DO concentration levels of 2 to 4 mg/L are desirable for secondary effluents, while DO concentrations of 6 to 8 mg/L might be needed for more advanced waste systems. In order to meet these DO requirements and to aid in waste remediation, mechanical aeration equipment is used, primarily in municipal waste water facilities.

Mechanical aeration equipment is expensive to purchase, install, maintain and operate. The energy costs alone make most aeration equipment infeasible for use in agricultural operations. Obviously, there is an urgent need for an economically affordable aerobic treatment method for wastewater treatment and storage facilities.

The purpose of a mechanical aeration system is to produce the oxygen that may be used either to satisfy the BOD in biological treatment processes or to act as an agent in the oxidation of undesirable contaminants. However, mechanical aeration systems are limited in their ability to increase dissolved oxygen above certain levels.

Aerobic treatment is common in the municipal wastewater field, but, due to the high costs involved in maintaining an adequate oxygen supply, most livestock producers have selected and utilized anaerobic treatment options. Today, aerobic treatment, particularly for livestock operations, is viewed primarily as a potential supplement to anaerobic digestion for reducing odor and ammonia volatilization.

Aerobic treatment of waste can be achieved through use of a microbial agent (i.e., a microbe) whereby microbes use dissolved and suspended organic matter as a source of food. These microbes produce oxygen as a byproduct of photosynthesis, along with other byproducts which may or may not be desirable in achieving waste remediation. As such, remediation of waste water using algal and/or bacterial cultures has been known in the art for many years. Nitrogen and carbon content can be reduced by cultivation of algae and bacteria in waste waters (Baumgarten et al., 1999, *Appl. Microbiol. Biotechnol.* 52:281–284) and growth of algae such as *Chlorella* species or *Scenedesmus* species in waste water reduces both chemical oxygen demand (COD) and biological oxygen demand (BOD) values below the discharge limits (Hammouda et al., 1995, *Ecotoxicol. Environ Saf.* 31:205–210). Microalgae are also known to remove various metals from waste waters (e.g., Chan et al., 1991, *Biomed. Environ. Sci.* 4:250–261).

There are a number of disadvantages in current aerobic treatment methods. One current disadvantage is that many of the microbes utilized are particularly sensitive to temperature and light conditions, and such microbes only flourish in optimum light and temperature conditions. Particularly in less temperate zones where there are greater variations in daily temperature highs and lows, most microbes do not flourish, particularly in the colder winter months. Accordingly, the rate at which waste is remediated greatly drops off during the winter months. Another factor which presently limits most aerobic treatment processes is that there must be certain existing levels of dissolved oxygen and water to be available in order for the micro-organisms to be metabolically active. Particularly in agricultural operations, the waste ponds often have a thick hard and dry upper crust which carries little or no oxygen and water. Subsequently, aerobic treatment for these types of waste situations is very inefficient. Another factor which limits the effectiveness of current aerobic processes is that many microbe species are unable to effectively adapt to new environments, and the wastes which the microbes encounter may not be optimum for sufficient growth of the microbes.

A number of prior art references disclose various systems and methods for remediation of human and animal waste.

U.S. Pat. No. 3,955,318 describes a process of purifying aqueous organic waste material by mixing algae with the waste under conditions whereby the mixture is aerated using a mixture of oxygen and carbon dioxide, combined with exposure to alternating, brief periods of light and darkness. In this system, the algae are supplied to the waste water from an outside source and can include any unicellular algae such as algae from *Chlorophyta, Euglenophyta, Chrystophyta, Pyrrophyta, Cyanophyta* and *Rhodophyta*.

U.S. Pat. No. 4,005,546 describes a method of waste treatment wherein a body of aqueous waste containing algae is transferred through multiple ponds, with each pond being exposed to different conditions. In a preferred embodiment, the first pond containing waste and algae is open to light and air. The contents of the first pond are then transferred to a second pond that is also open to light and air, where additional algae nutrients are added and the pond is continuously agitated. Finally, the contents of the second pond are transferred to a pond that is shielded from light and dark. The algae in this system naturally occur in the waste water, although algae can be reintroduced from the third, dark pond back into the first pond.

U.S. Pat. No. 4,209,388 describes a method of waste treatment which includes a first process of introducing waste into an algae containing pond which is either aerated, facultative, or a combined aerobic and anaerobic pond, followed by transfer of the waste water to a second pond where the algae are deprived of nutrients and sunlight, causing algal death and settling. The waste water is then transferred to a third pond to separate the water from the dead algae. The source and types of algae used in this system are not disclosed.

U.S. Pat. No. 4,267,038 describes a purification system for waste water in which includes steps of removal of solids from the waste water as sludge, digestion of the sludge and recombining with the waste water, a step of anaerobic, bacterial oxidation of waste water organics, followed by nutrient stabilization, nitrification, denitrification and reaeration, and then transfer of the water from the anaerobic tanks to one or more tanks containing algae and aerobic bacteria. The treated water can be channeled through a variety of tank combinations, including recycling back through anaerobic or aerobic tanks, cycling through series of aerobic tanks, and dewatering of algae for collection of the algae as a useable end product.

U.S. Pat. No. 4,966,713 describes a process for treating waste water from a food processing plant using a flocculant comprising a crude algal composition or processed algae and an acidic pH. The process produces a floc which is then separated from the water. The algae source can include *Rhodophyceae, Cyanophyceae, Cholorophyceae* and *Phaeophyceae*.

U.S. Pat. No. 6,350,350 describes a process for removing pollutants from waste water by running the waste water over a bed of algae in an attached periphyton bed. The algae are then harvested for use in a mix with a shredded paper product to produce a pulp.

In addition to these processes, various algal species have been described as being useful for bioremediation methods, being capable of utilizing waste products, or as naturally occurring within waste waters. Such algae include *Chloella* species and *Scenedesmus* species (see, e.g., Matusiak et al., 1977, *Acta Microbiol*. 26:79–93; Chrost et al., 1975, *Acta Microbiol. Pol B* 7:231–236; Matusiak, 1976, *Acta Microbiol Pol* 25:233–242; Chan et al., 1991, supra; Baumgarten et al., 1999, supra; Hammouda et al., 1995, supra). U.S. Pat. No. 3,882,635 describes *Prototheca sphaerica* FERM P-1943 as being capable of growing on a wide variety of waste waters of the food industry. This species is alleged to be superior to *Chloella* species with regard to the carbon sources on which these algae can grow.

U.S. Pat. No. 5,447,850 discloses a method of producing methane from organic waste. The method includes the use of aerobic microorganisms which are inoculated in the waste. The waste is then fermented with the aerobic microorganisms. The waste is also inoculated with anaerobic microorganisms. The waste is placed in an oxygen free environment, and methane is then evolved from the waste.

U.S. Pat. No. 5,755,852 discloses a nutrient rich humus material produced by a process wherein solids in an aqueous slurry of animal excrement are settled or precipitated in a solids ecoreactor, the slurry being treatable before and/or after settlement in the ecoreactor by passing to a bioreactor wherein phosphorus may be precipitated with metallic salts. Aerobic and non-aerobic treatment is used for the slurry to form an active biomass that bioconverts remaining phosphorus, nitrogen and organics. The slurry is recycled to the solids ecoreactor and/or is discharged. At least a portion of the slurry is bioconverted and recovered as a humus material.

U.S. Pat. No. 5,277,814 discloses a process for treating organic wastes. The process may be conducted in a closed reactor with controls to prevent adverse environmental impacts. The process includes mixing wastes with inert bulking agents. An oxygen containing gas is passed through the reaction mixture to assist in removal of excess water from the waste to form a wetted high solids content reaction mixture containing the waste solids mixed with the bulking agent. Aerobic reaction conditions are employed to convert the wastes to a treated waste. The aerobic reaction contemplated within this process utilizes various bacterium.

U.S. Pat. No. 5,472,472 is a related patent to the '852 patent discussed above and discloses the same invention.

U.S. Pat. No. 6,329,196 discloses a biological process enhanced by a method and apparatus used to contact a biomass with a gas and with a nutrient liquid. A compressible porous matrix system containing the biomass is mounted in a reaction vessel containing a body of the nutrient liquid and a body of the gas above the body of the liquid. The liquid has an upper surface exposed to the body of gas defining a liquid gas interface. The compressible porous matrix system is partly immersed in the liquid and extends partly above the upper surface of the liquid. The system is rotated about a horizontal axis such that there is periodic compression and expansion of regions of the porous matrix system without significant loss to the biomass.

U.S. Pat. No. 6,325,934 discloses an enzyme and bacterial combination in a slowly dissolvable matrix for septic tanks, grease traps and waste treatments. Sewage waste bacteria and enzymes are incorporated into a slow release material and delivered to the site of the waste to digest the solid waste. The slow release material is heavy so that the enzymes and bacteria will be delivered to the sludge in the bottom of the sewage digester chamber and are fat soluble so that the enzymes and bacteria will be delivered to the grease to be digested. The delivery system prevents enzymes and bacteria from being diluted in grey water which would otherwise render them less effective and would cause them to be discharged from the sewage system.

U.S. Pat. No. 6,281,001 discloses a process for composting of organic materials and for bioremediation of soils. The composting is conducted in a sealed container. The composition of the organic material is adjusted to a compostable mixture. The adjustment is done by adjusting the organic material and by mixing the organic material with a bulking agent and an inoculant. The method includes monitoring and adjusting the conditions of the composting mixture to maintain conditions within preselected limits.

U.S. Pat. No. 6,277,279 discloses a method for treating waste water by promoting growth of particular microbes capable of degrading undesirable organic material in the waste water. The method includes applying a composition that comprises fatty acids which are shown to provide greater microbial degradation. The fatty acids are preferably a combination of one or more saturated and unsaturated fatty acids. Because the unsaturated fatty acids can be in the liquid phase at room temperature, it is preferred to provide the combination of saturated and unsaturated fatty acids together to form a solid particulate at room temperature and to remain at a solid even at elevated outdoor temperatures.

U.S. Pat. No. 5,904,851 discloses a process for oxygenating a liquid. This particular invention contemplates the use of an aerobic process by carrying out a chemical or microbiological reaction in the oxygen enriched water. The invention further contemplates a therapeutic process of carrying out a treatment of the liquid with an agent containing the oxygen enriched liquid as a vehicle.

U.S. Pat. No. 5,622,864 discloses an apparatus for remediating contaminated soil containing organic compounds. More particularly, this invention is directed towards remediation of soil contaminated with hydrocarbons. The contaminated soil is placed within a container and covered by a pool of recirculating water carrying selected biological elements and chemicals to affect the remediation process.

U.S. Pat. No. 6,146,507 discloses a manure slurry pre-treatment apparatus and method for pre-treating manure. The primary purpose of the method is to alter the gas production which occurs during subsequent treatment within a manure pond. The method primarily contemplates the use of a pre-treatment zone in which the manure slurry is subjected to an alternating electrical current.

U.S. Pat. No. 5,716,523 discloses methods and compositions for treating onsite animal waste pits in order to soften the fluidized hardened solid wastes therein. The method utilizes a particular type of bacteria for the treatment.

U.S. Pat. No. 5,627,069 is a related patent to the above '523 patent and also discloses the same invention in which particular strains of bacteria are used for remediation of the waste pits.

U.S. Pat. No. 4,316,961 discloses a process for production of methane gas by anaerobic digestion of plant material and organic waste.

U.S. Pat. No. 4,432,869 discloses a method of treating animal waste which includes use of an algae/bacteria mixture culture in a separate stage. The pH-value of the algae/bacteria mixture culture is controlled in such a way that a multiplication of rotifers in this stage is inhibited or precluded. The algae/bacteria mixture culture preferably occurs in shallow open air ponds for a period of time. The hold time of the algae/bacteria suspension which is in the rotifer container is adjusted to a pH of 6–8 and can range from two to four days. The single FIGURE in this patent illustrates the basic method. The specific algae contemplated for use in this invention includes various species of *chlorella* or *scenedesmus*.

U.S. Pat. No. 6,214,617 discloses a centrifugal fermentation process in which living cells or subcellular biocatalysts are immobilized by opposition of forces. The immobilized cells or biocatalysts may be attached to support complexes that add to the resultant vector forces. The invention can also be viewed as a method of removing contaminants from liquid comprising a biocatalyst in at least one chamber in a centrifugal force field wherein a continuous flow of liquid acts to create a force which opposes the centrifugal force field and wherein a gravitational force contributes to the resultant vector summation of all forces acting on the biocatalyst. The gravitational force, the centrifugal force and opposing liquid force substantially immobilize the biocatalyst. One of the biocatalyst includes algae cells.

U.S. Pat. No. 5,744,041 discloses a method for the step-wise reduction of biological oxygen demand of a waste material having a high concentration of organic waste. The method includes the steps of providing waste material having a biological oxygen demand and allowing the waste material to separate into a liquid fraction including water and organic waste, and allowing at least a portion of the organic waste to be anaerobically digested by microorganisms occurring in the waste. A portion of the liquid fraction having the reduced biological oxygen demand in relation to the oxygen demand of the waste material is removed and mixed with aerobic microorganisms and an aerating gas and allowing at least a portion of the organic waste to be aerobically digested by the aerobic microorganisms to form a liquor including water and suspended solids. Then, a portion of the suspended solids in the liquor is allowed to settle, forming a clarified liquor having a reduced biological oxygen demand relative to the oxygen demand of the liquor. The clarified liquor is subjected to microzone organisms from the clarified liquor to form a permeate having a reduced biological oxygen demand relative to the clarified liquid. Finally, at least a portion of the permeate is discharged or reused. In one embodiment of the process, the aerobic microorganisms comprise green algae of the genus *Chlorella*.

Although these references may be adequate for their intended purposes, there still exists a need for a system and method for remediation of wastes that incorporates the use of a highly efficient microbe capable of producing large amounts of oxygen, is adaptable to various environmental conditions, and can be delivered to the waste site at a minimum cost. There is also a need for an aerobic system and method of remediation incorporating a microbe which reproduces at a high rate, thus increasing the efficiency of aerobic treatment.

SUMMARY OF THE INVENTION

In accordance with the present invention, a system and method are provided for remediation of waste which provides an efficient and cost-effective solution through incorporation of microbes which produces high amounts of oxygen. The invention also incorporates use of a simple mechanical and electrical system which is used to optimize growth of the microbial culture and to deliver the culture to a waste site.

The invention provides high levels of oxygen to targeted waste areas, such as waste water ponds, and remediation takes place through an aerobic process. Preferably, an assemblage, or culture, of microalgae is used for the remediation (described in detail below). The system includes a structure and supporting equipment in order to maximize the growth of the microorganisms so the culture can be delivered to a waste site upon demand and over an extended period of time.

One object of the invention is to provide a cost effective yet efficient aerobic remediation process which can handle high levels of human or animal waste.

It is another object of the invention to provide a system that can be customized to treat human and livestock waste on both a small and large scale.

It is yet another object of the invention to provide a system that is adaptable to and effective in a wide range of geographical and climatic conditions.

It is yet another object of the invention to provide an aerobic remediation solution which does not involve the use of potentially hazardous chemicals or processes within the remediation process thereby making the invention an environmentally friendly solution to remediating waste.

The method and system of the invention provides for aerobic remediation of waste by the introduction of one or more species or strains of microalgae. Culturing and delivery methods are optimized in order to ensure the success of colonization of the microbes within the targeted waste areas, despite differing environmental and climatic conditions.

A structure is provided adjacent to the remediation site in order to culture the microbes, and to provide a continual source of the microbes to remediate the waste over a long period of time. A greenhouse type structure is preferred in order to best control the particular climatic conditions thereby optimizing an environment for which to grow the culture. A desired number of production tanks (e.g., growth tanks) are placed within the greenhouse structure, and the microalgae are introduced into the production tanks for growth of the algae. The particular structure can be sized to accommodate the particular site to be remediated. Preferably, the microalgae are grown at an optimum temperature range of 70 to 90° F. The structures are built of a sufficient strength to meet typical snow and wind loads which may be encountered. The greenhouse structure is also preferably translucent on all sides to allow maximum interior sunlight for microbial growth. The production tanks receive water from either a typical municipal water supply, or from well water. The incoming water supply may be temperature controlled in order to accommodate the desired temperature in the production tanks. The greenhouse structure is also lighted, for example by halogen lights, in order to provide supplemental light for algal growth and photosynthesis on overcast days or periods of short daylight hours as encountered during the winter months. Preferably, the microalgae in the production tanks receive light for approximately 20 hours per day, accompanied by 4 hours of darkness.

Nutrients are delivered to the production tanks in order to feed the microalgae and to optimize their growth so that the algae can be delivered on a continual basis to the waste site. In 1000 gallon production tanks, the nutrients, in the form of a growth medium, are added at a typical rate of about 8 ounces to about 16 ounces (by volume) of conventional growth medium per day, dependent upon the growth rate measured within each tank, and dependent on the source and concentration of the growth medium stock, or in any suitable concentration for the growth of microalgae as directed by the manufacturer of the growth medium stock. Preferably, the microalgae experience optimal growth when the water within the production tanks is maintained in a pH range from about 7.5 to 9.4 (with a pH of from about 7.5 to about 9.0 being preferred), and the concentration of dissolved oxygen is maintained at between about 5 milligrams per liter and 25 milligrams per liter. Measurements are taken by onsite personnel on a daily basis using accepted industry monitoring equipment to maintain proper growth rates for the algae by monitoring the temperature of the growth tank water, pH, hours of light verses darkness, dissolved oxygen, and any other factors which may impact the growth of the microalgae. Preferred growth conditions are described in detail below.

Conveniently, animals such as goldfish may be grown in the production tanks as a quick and reliable visual monitor of dissolved oxygen in each of the tanks, the goldfish also supplying additional nutrients to the tank water for consumption by the algae. Of course, low levels of oxygen in the water would be indicated by mortality of the goldfish.

Using the 1000 gallon production tanks, approximately 700 gallons of culture laden liquid per tank per day may be delivered to the waste site either by gravity flow or a pressurized pump system. The goal for each of the production tanks is to provide the maximum growth of the microalgae within a 24 hour period and delivery of the algae to the waste site. Preferred delivery of the culture to the waste site occurs by a continual metered flow of the liquid. For a 700 gallon delivery per day, this equates to approximately a ½ gallon per minute delivery rate. Fresh water then is added to the tank at the same rate to compensate for the lost liquid.

Depending upon the particular site to be remediated, the culture can be delivered in the desired quantities to one or multiple locations within the site. For smaller waste ponds, it may only be necessary to have a single line which runs into the waste pond for delivery of the culture laden liquid. However, even in smaller waste ponds, it is desirable to have at least some circulation within the waste pond so that the culture may be uniformly distributed throughout the waste pond. For larger waste ponds, it may be necessary to install a manifold system whereby there are multiple points of delivery for the culture into the waste pond. For example, multiple lines located at spaced locations throughout a particular pond can be used to provide a more even distribution for delivery of the culture laden liquid. Preferably, each line would have a single outlet point for delivery of the culture, and each of the lines would be sized to accommodate the desired flow for delivery of the culture. For larger waste ponds, it is also desirable to have some type of circulation within the waste pond to better distribute the culture. Any number of different types of mechanical agitators may be used in conjunction with delivery of the culture. Additionally, circulation within a particular waste pond can be enhanced by use of a diffuser which creates a continuous stream of fine bubbles. It has been shown that use of diffusers enhances circulation or turbidity within the waste pond to thereby enhance distribution of the culture. Normally, diffusers are provided in waste ponds to increase dissolved oxygen within the water to enhance aerobic remediation of the waste. With the present invention, use of a diffuser may have some secondary benefits in increasing the amount of dissolved oxygen, but the primary means of providing increased oxygen within a waste pond is still achieved by the culture.

Nutrients may be delivered to the production tanks either manually, or preferably through an automatic system by incorporation of a food/nutrient tank which meters nutrients into the production tanks. If automation is desired, the food/nutrient tank itself is either manually or automatically supplied with optimal nutrients.

Although reference is made to microalgae for use in the system and method of the invention, it shall be understood that the system and method are not specifically limited to use of microalgae. The system and method can be used in conjunction with other types of microbes for use in remediation of waste. Preferred assemblages of microalgae for use in the present invention are described in detail below.

Ultimately, it is desired to achieve a critical mass of the microalgae in the waste site to produce enough oxygen to create effective remediation. In waste water holding ponds, the microalgae have shown to eliminate crust and sludge, to greatly reduce noxious orders from ammonia and hydrogen sulfides, to greatly reduce $NH_3$-N and BOD levels to meet local and federal permit standards, and to maintain at least minimum dissolved oxygen concentrations at or above one milligram per liter, as well as maintain acceptable pH levels in the treated waste. Conveniently, the culture in the production tanks can also be fed by waste from the actual waste site that is being remediated. Thus, in accordance with this invention, nutrients can be provided to the culture in the production tanks to supplement nutrients provided manually or automatically from a food tank, or the waste from the waste site itself can provide all the nutrients necessary to culture the microalgae. A pipe system and pump can be used to pump the waste from the waste site into the production tanks at a desired rate. The waste from the waste site may be used as a source for nutrients.

These and other advantages will become more apparent from a review of the following drawings, taken in conjunction with the detailed description.

BRIEF DESCRIPTION OF THE DRAWINGS

FIGS. 5 and 6 are schematic diagrams of two examples of the type of waste pond/lagoons which may be remediated by the system of the present invention.

DETAILED DESCRIPTION

Description of the Process and System of the Invention

Figure 1:
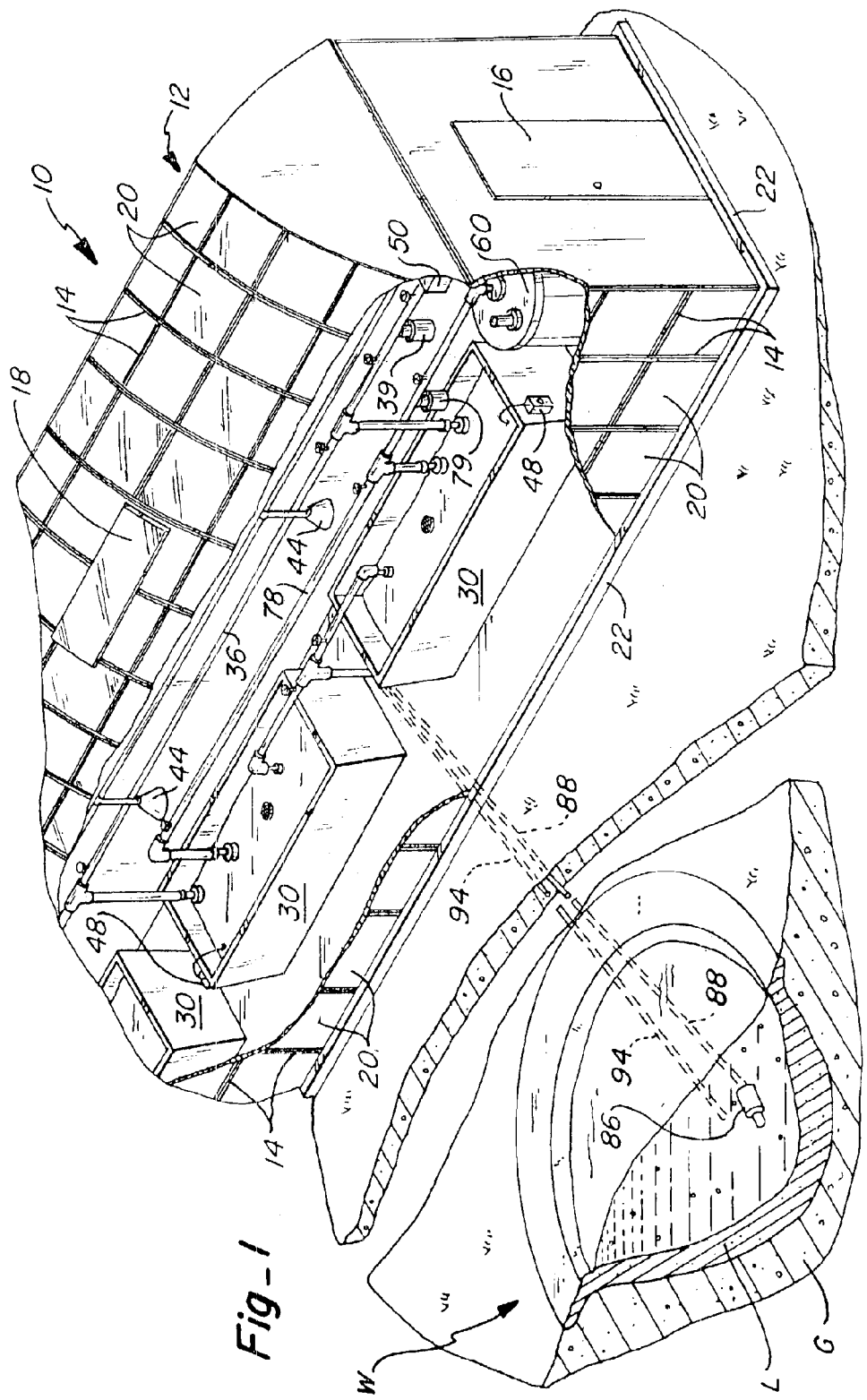
FIG. 1 is a partial fragmentary perspective view of a first preferred embodiment of the system of this invention incorporated within a structure which is placed adjacent to a waste site to be remediated, the figure showing the structure broken away in order to reveal processing equipment used to culture the microalgae, along with means by which the microalgae is delivered to the waste site, and also showing means by which the waste site can be used to provide nutrients to the production tanks.

FIG. 1 illustrates the system of the current invention incorporated within a structure which houses various mechanical and electrical elements used to grow the microbial culture, and to transfer the culture to the waste site. Beginning first with the description of the system 10 with respect to the structure which houses the mechanical and electrical components, a structure 12 in the form of a greenhouse having a translucent exterior is provided at a location nearby a waste pond W or waste site which requires remediation. The structure 12 comprises a frame 14 for supporting the exterior of the structure. Frame 14 may be made of any well known construction material to include steel or wood framing materials and spaced to provide the adequate support for a plurality of window panels 20 which are mounted to the frame. One example of a suitable material for use for the panels may be 8 millimeter twin wall polycarbonate sheets. These type of panels are typically used in greenhouses. The structure 12 may be placed upon a concrete pad 22 which can be poured at a convenient location near the waste site W. Concrete anchors (not shown) can be used to attach the frame 14 to the concrete pad 22. One or more doors 16 can be provided for access to the structure. A vent 18 can be formed on the structure in order to help control the temperature within the structure. As well understood by those skilled in the art, greenhouse structures quickly heat by exposure to sunlight, even in fairly cold temperatures. The vent 18 can be controlled manually, or automatically by a damper control (not shown) which adjusts the opening of the vent. Although one vent 18 is shown, a number of additional vents may be provided as needed to provide adequate temperature control within the greenhouse. During particularly cold times, the structure 12 may be heated by any conventional means to include electrical or gas heat.

Figure 2:
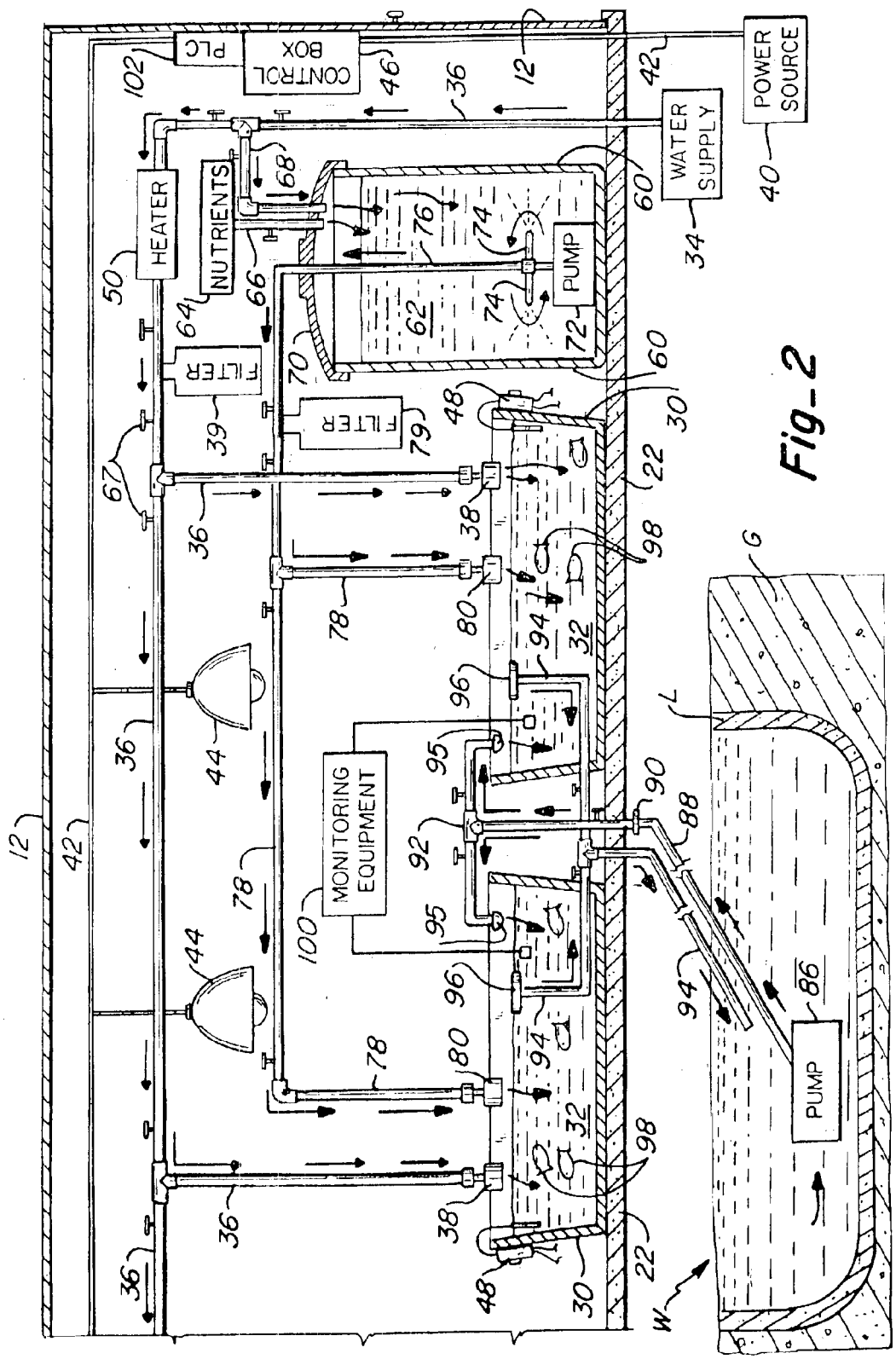
FIG. 2 is a schematic diagram illustrating the first preferred embodiment, to include the various components used within the system for remediation.

Now also referring to FIG. 2, the structure 12 illustrates a number of culture or production tanks 30 which are used to culture the microbes which are to be introduced to the waste site. The culture/production tanks are filled with water 32 which may be provided from a water supply 34, such as municipal water, or well water. A water piping system 36 is constructed to provide water to each of the culture tanks 30. Nozzles 38 of a desired orifice size may be used to allow the water 32 to be introduced within the tanks at a desired rate. Upstream of the nozzles 38, a water filter 39 can be provided to filter the water from many potentially undesirable contaminants. For example, if municipal waste water is used, it may be desirable to limit the amount of chlorine which may be present in the municipal waste water. Although chlorine within normal municipal water limits is not unduly harmful to the microbial culture, use of filter 39 provides flexibility in filtering not only chlorine, but any other contaminants that might be present, to include undesirable minerals.

A power source 40 is provided to run the various mechanical and electrical devices within the structure. Lamps 44 are positioned over the tanks 30 to provide additional hours of light to the culture tanks, especially during overcast days and during the months of winter. As discussed above, it is generally preferable to have approximately 20 hours of light exposure for the culture in order to maximize its growth. Halogen lights are but one example the type of lights which may be used within the structure. Generally, it is desirable to provide an artificial light source which most closely matches the spectrum of light provided by the sun, to include ultraviolet light. A control box 46 may be mounted at any convenient location within the structure to provide the various switches and controls for manipulating the mechanical and electrical equipment within the structure. Each of the culture tanks may be equipped with thermostats 48 which measure the temperature of the water. If necessary, the incoming water may be heated by inline heater 50. Inline heater 50 may be an electrical coil type heater which effectively raises the temperature of the incoming water. Because the optimum temperature range for growth of the microbes is between about 70 to 90° F., it would be quite unusual to encounter a circumstance when the water temperature in the tanks would be maintained above 90° F. for any appreciable amount of time. Therefore, it would not normally be necessary to provide some means to cool the water within the culture tanks. Nonetheless, the invention also contemplates the capability to cool the water in the tanks by providing an inline cooling device, (not shown) which would cool the water prior to entering the tanks. Such a device could be mounted adjacent to the heater 50.

Nutrients (e.g., growth medium) can be introduced into the tanks 30 either manually, or through a more automated means. As shown in FIG. 2, a nutrient storage tank 60 may be situated adjacent the production tanks, and nutrient delivery lines 78 can interconnect tank 60 to the production tanks 30. Nutrients 64 may be introduced into the tank via line 66. The nutrients 64 would then be mixed within the storage tank 60 along with water which is supplied through water inlet 68. A removable top 70 allows access to the interior of the tank 60 for cleaning or maintenance. Accordingly, the lines 66, 68 and 78 can be disconnected as required for cleaning access to the tank 60. Any number of shutoff valves 67 can be provided in both the water and nutrient lines to allow repair or replacement of the lines or components placed in line with the lines. To prevent undue settling of solids within the tank 60, a series of jets 74 mounted on an internal delivery line 76 may be used to keep the nutrients well mixed within the tank. Pump 72 can be used to provide the power for jets 74, as well as to transfer the nutrient mixture to the culture tanks through internal delivery line 76 which connects to delivery lines 78. Thus, line 76 provides not only a means for mounting the jet 74, but also provides a line within the tank communicating with line 78 for transfer of the nutrient mixture. An inline filter 79 can also be provided to filter out undesirable components in the nutrient mixture, such as unduly large solids. Nozzles 80 may also be provided to meter the nutrient mixture into the tanks at the desired rate. For both the water lines 36 and the nutrient mixture lines 78, the necessary back pressure is required to insure that the nozzles deliver the water and nutrient mixture at the designed rates through the respective nozzles.

During startup, the tanks 30 would be filled, and the microbes (e.g., microalgae) would be placed manually into the tanks. Then, the nutrients would be delivered to the tanks to allow the microbes to begin to grow. Once the desired level of growth had occurred within the tanks 30, the tanks can then be emptied at a desired rate to deliver the microbes to the waste site W. The loss of liquid within the tanks by delivery of the culture to the waste site is then compensated by additional water and nutrients added to the culture tanks. Accordingly, the production tanks 30 are kept at a steady state wherein there is continual flow through the tanks, and the microbes continue to grow in the tanks. The culture delivery lines 94 conveys the culture laden liquid to the waste site. Preferably, the structure 12 is situated at an elevation which is higher than the waste site W so that gravity flow may be used for delivering the microbes to the waste site. Floats 96 can be provided to prevent the tanks from overflowing, and to meter the release of culture laden liquid into lines 94.

As a supplemental nutrient source, or even as a primary nutrient source, waste within the waste site W may be pumped to the production tanks. In some circumstances, the waste site W may by itself provide the required nutrients that allows the culture to grow at the desired rate, without any additional nutrients being provided from an outside source. Accordingly, a pump 86 may be situated directly within the waste site, and line 88 may deliver the waste to the culture tanks for use as nutrients to feed the culture. A filter 90 can also be provided to filter solids and other undesirable components which may be pumped from the waste site. A simple distribution unit 92 which communicates with line 88 may be used for direct delivery of the waste/nutrients to the tanks. Delivery unit 92 may also include respective nozzles 95 which meter the waste/nutrients into the tanks. If the waste site W is located at an elevation higher than the tanks, then a pump (not shown) could be installed on line 94 for delivery of the culture laden liquid. Typically, a waste site requires a liner L to prevent the waste from seeping into and thus contaminating the ground G.

Oxygen levels within the production tanks 30 can be monitored by placing fish 98, such as goldfish, within the tanks. Goldfish are very sensitive to oxygen levels, and can serve as a quick check for proper oxygenation levels in the production tanks. Dead fish would presumably indicate a low level of oxygen and therefor poor growth of the culture. In addition to temperature monitoring of the tanks and visual oxygenation checks by use of the fish, the tanks may also be monitored daily to insure correct pH and to actually measure dissolved oxygen levels. Standard YSI instruments may be used for monitoring these parameters.

The system can be automated to the desired extent, depending upon the size of the site to be remediated, and other factors. For example, for an extremely large waste site, it may be necessary for more hands-on observation of the system to ensure proper growth of the microbial culture and delivery to the waste site. However, it is contemplated within the spirit and scope of this invention to provide a system whereby minimal interference is necessary to maintain a continual culture growth and delivery of culture to the waste site. For example, a programmable logic controller (PLC) or other computer means may be incorporated to provide automation. The various measurements which are taken to check the status of the culture can be input to the PLC. The PLC can then generate various outputs for control of the system. For example, the thermostats 48 mounted on or near the tanks would be one example of an input to a PLC, while activation of the heater would represent an output responsive to commands by the PLC for heating the tanks. Light, pH control, as well as dissolved oxygen could also be automatically monitored by measurement devices communicating with the tanks. A PLC could process these inputs and then provide outputs to vary or adjust these parameters. In another example, the PLC could control a valve which allows introduction of a chemical into the tanks for adjustment of the PH in response to an out of limit PH condition. Another example of PLC control might include automatic delivery of nutrients to the tanks 30 by activation of pump 72 in response to low levels of measured nutrients in the tanks 30.

FIG. 2 also shows that monitoring equipment 100 may be used to monitor the status of the production tanks. For example, the monitoring equipment could include industry accepted oxygen monitoring devices, devices used for measuring PH levels in the tanks, or other measuring devices to measure various other parameters of the culture laden liquid within the tanks 30. The results of the monitoring efforts can be then addressed by manual intervention to correct problems, or by automatic intervention by the PLC. For automated responses, the results of the monitoring efforts can be used as inputs to a PLC 102 shown mounted adjacent the control box 46. The PLC 102 can actually be incorporated within the control box 46, as understood by those skilled in the art.

Description of Microorganisms Useful in the Invention

Preferably, the culture used in the present invention is an assemblage of microorganisms which is defined as any suitable assemblage, mixture, consortium, biomass, culture or group of microbial species that is suitable for remediation of waste as described herein. The microbial species can include microalgae, bacteria, and other microbial species. Although the assemblage contains a population of at least one microalgal species/strain, assemblages useful in the present invention preferably include more than one species of microalga. The assemblage may also contain microbial species other than microalgae, such as various strains of bacteria or other microbes. Microalgae that are particularly useful in an assemblage of the present invention include, but are not limited to, any microalgae from any one or more of the following divisions: *Chlorophyta* (Green algae), *Bacillariophyta* (Diatoms), *Cyanophyta* (Blue-green algae), *Pyrrhophyta* (Dinoflagellates), *Euglenophyta, Cryptophyta,* and *Chrysophyta*. In one aspect, the dominant taxa in the assemblage include microalgae from the division *Chlorophyta* (Green algae).

Microalgae from the division *Chlorophyta* can include, but are not limited to, microalgae from the following genera and species: *Micractinium* spp. (e.g., *Micractinium pusillum*), *Carteria* spp, *Ankistrodesmus* spp. (e.g., *Ankistrodesmus falcatus*), *Scenedesmus* spp. (e.g., *Scenedesmus abundans, Scenedesmus dimorphus, Scenedesmus opoliensis, Scenedesmus quadricauda, Scenedesmus serratus, Scenedesmus bijuga*), *Ulothrix* spp., *Dictyosphaerium* spp. (e.g., *Dictyosphaerium pulchellum*), *Chlorococcaceae* spp., *Golenkinia* spp. (e.g., *Golenkinia radiata*), *Cosmarium* spp., *Dimorphococcus* spp. (e.g., *Dimorphococcus lunatus*), *Pediastrum* spp. (e.g., *Pediastrum boryanum*), *Stigeoclonium* spp., *Chlamydomonas* spp., *Pandorina* spp., *Monoraphidium* spp., and *Chloella* spp. In one aspect, an assemblage according to the invention can include, but is not limited to, any one or more of the following genera of *Chlorophyta*: *Micractinium, Carteria, Ankistrodesmus, Scenedesmus,* and *Ulothrix*. In another embodiment, an assemblage according to the invention can include, but is not limited to, microalgae of any one or more of the following genera: *Chlorococcaceae, Ankistrodesmus, Chlamydomonas, Dictysophaerium, Gonium, Micractinium, Pandorina, Scenedesmus*. In another embodiment, an assemblage according to the invention can include, but is not limited to, microalgae of any one or more of the following genera: *Ankistrodesmus, Chlamydomonas, Gonium, Micractinium, Pandorina*. In another embodiment, an assemblage according to the invention can include, but is not limited to, microalgae of any one or more of the following genera: *Chlorococcaceae, Ankistrodesmus, Golenkinia, Gonium, Micractinium*. In another embodiment, an assemblage according to the invention can include, but is not limited to, microalgae of any one or more of the following genera: *Ankistrodesmus, Carteria, Micractinium, Scenedesmus*. In another embodiment, an assemblage according to the invention can include, but is not limited to, microalgae of any one or more of the following genera: *Ankistrodesmus, Golenkinia, Micractinium, Scenedesmus*. In another embodiment, an assemblage according to the invention can include, but is not limited to, microalgae of any one or more of the following genera: *Chlorococcaceae, Ankistrodesmus, Carteria, Chlamydomonas, Cosmarium, Micractinium, Pediastrum, Scenedesmus*. As will be apparent to those of skill in the art, various combinations of Green algae are useful in the present invention.

Microalgae from the division *Bacillariophyta* can include, but are not limited to, microalgae from the following genera and species: *Fragilaria* spp. (e.g., *Fragilaria construens*), *Navicula* spp., *Nizschia* spp. (e.g., *Nizschia amphibia, Nizschia palea*), *Synedra* spp. (e.g., *Synedra cyclopum, Synedra tenera, Synedra ulna*), *Achnanthes* spp., *Amphora* spp., *Gomphonema* spp., and *Pseudanabaena* (e.g., *Pseudanabaena galeata*). In one aspect, an assemblage according to the invention can include, but is not limited to, any one or more of the following genera of *Bacillariophyta*: *Fragilaria* and *Nitzschia*. In another aspect, an assemblage according to the invention can include, but is not limited to, any one or more of the following genera of *Bacillariophyta*: *Achanthes, Amphora, Fragilaria, Gomphonema, Nitzschia*. In another aspect, an assemblage according to the invention can include, but is not limited to, any one or more of the following genera of *Bacillariophyta*: *Amphora, Fragilaria, Navicula, Nitzschia*. It will be apparent to those of skill in the art that various combinations of genera of *Bacillariophyta* can be included in an assemblage of the invention.

Microalgae from the division *Cyanophyta*, although not preferred for inclusion in an assemblage of the invention, can include, but are not limited to, microalgae from the following genera and species: *Lyngbya* spp. (e.g., *Lyngbya subtilis*), *Merismopedia* spp. (e.g., *Merismopedia tenuissima*), *Oscillatoria* spp. (e.g., *Oscillatoria amphibia, Oscillatoria tenuis*), *Chroococcus* spp., *Pseudanabaena* spp.

Microalgae from the division *Pyrrhophyta* can include, but are not limited to, microalgae from the genus *Peridinium* and *Gymnodinium*.

Microalgae from the division *Cryptophyta* can include, but are not limited to, *Cryptomonas* and *Rhodomonas*.

An assemblage useful in the present invention can include strains of microalgae from any one or more of the above-identified algal divisions and genera, and is preferably a mixture or combination of species from several different genera and divisions of microalgae. Any combination of divisions, genera and/or species of microalgae, and particularly of the divisions and genera described herein, is contemplated for use in the present invention. For example, a combination of any two or more algae in an assemblage of the present invention can be selected from any of the divisions, genera and species listed in Table 2 (see Example 3). In one aspect of the invention, an assemblage useful in the bioremediation process of the invention comprises at least one or more species of algae from *Chlorophyta*, with additional species from the Diatoms being another preferred embodiment. Algae from the division *Chlorophyta* are the most preferred for inclusion in an assemblage of the invention and in some embodiments, it is preferable to have few to no members of *Cyanophyta* in the assemblage. In general, the members of *Cyanophyta* found in an assemblage of the invention are not related to water quality. Many exemplary strains of the microalgal species described above for inclusion in an assemblage for use in the present invention can be readily obtained from any public depository, such as the American Type Culture Collection (ATCC), Manassas, Va. 20108; the Culture Collection of Algae and Protozoa (CCAP), United Kingdom; or The Culture Collection of Algae at the University of Texas at Austin (UTEX). For example, several publicly available strains of microalgae that could be used in an assemblage of microalgae according to the present invention are provided in the attached Table 1. Many other genera and species are also publicly available and are too numerous to list herein. Alternatively, an assemblage comprising microalgae useful in the present invention can be isolated from any natural source, including any source of fresh water (pond, bog, lake, including waste ponds and remediation sites). In particular, any natural water sources where the nitrogen to phosphorus ratio is high, and where the absolute concentration of inorganic nitrogen in high are good natural sources for collection of microalgal cultures that are predicted to grow well in the waste remediation system of the present invention.

TABLE 1

| Organism | Accession No. |
|---|---|
| *Fragilaria shilol* | ATCC 50218 |
| *Fragilaria crotonesis* | CCAP 1029/8 |
| *Fragilaria pinnata* | CCAP 1029/2 |
| *Navicula hanseni* | CCAP 1050/8 |
| *Nitzschia commutata* | CCAP 1052/13 |
| *Nitzschia epithemoides* | CCAP 1052/18 |
| *Synedra acus* | CCAP 1080/7 |
| *Synedra delicatissima* | CCAP 1080/10 |
| *Ankistrodesmus densus* | CCAP 202/20 |
| *Ankistrodesmus falcatus* | CCAP 202/5A |
| *Carteria crucifera* | CCAP 8/7C |
| *Carteria eugametos* | CCAP 8/3 |
| *Cosmarium bioculatum* | CCAP 612/17 |
| *Dictyosphaerium pulchellum* | CCAP 222/1A |
| *Micractinium pusillum* | CCAP 231/1 |
| *Micractinium* sp. | CCAP 248/2 |
| *Scenedesmus abundans* | CCAP 211/23 |
| *Scenedesmus opoliensis* | CCAP 276/15 |
| *Scenedesmus quadricauda* | CCAP 276/16 |
| *Scenedesmus* sp. | CCAP 276/5 |
| *Scenedesmus quadricauda* | ATCC 11460 |
| *Scenedesmus bijugatus* | ATCC 11462 |
| *Pediastrum duplex* | CCAP 261/9 |
| *Pediastrum tetras* | ATCC 30435 |
| *Stigeoclonium farctum* | CCAP 477/10A |
| *Ulothrix confervicola* | CCAP 386/2 |
| *Ulothrix fimbriata* | CCAP 384/2 |
| *Ulothrix* | ATCC 30443 |
| *Lyngbya* sp. | CCAP 1446/5 |
| *Oscillatoria bornetii* fo. *tenuis* | CCAP 1459/19 |
| *Oscillatoria tenuis* | CCAP 1459/4 |
| *Oscillatoria* sp. | CCAP 1459/12A |
| *Pseudanabaena* sp. | ATCC 29207 |
| *Euglena gracilis* | CCAP 1224/5A |
| *Peridinium cinctum* | CCAP 1140/1 |

In one aspect of the invention, an assemblage of microorganisms is provided comprising dominant taxa accounting for more than 50%, 55%, 60%, 65%, 70%, 75%, 80%, or 85% of the biomass from the division *Chlorophyta*. In another aspect of the invention, an assemblage of microorganisms is provided comprising the following microalgal composition: (1) dominant taxa accounting for more than 50%, 55%, 60%, 65%, 70%, 75%, 80%, or 85% of the biomass from the division *Chlorophyta*; (2) subdominant taxa comprising microalgal strains from: *Chlorophyta* and *Baccillariophyta*; (3) rarely encountered taxa comprising microalgal strains from *Chlorophyta, Baccillariophyta* and *Pyrrhophyta*. In another aspect, an assemblage of the invention comprises the following microalgal composition: (1) dominant taxa accounting for more than 50%, 55%, 60%, 65%, 70%, 75%, 80%, or 85% of the biomass from the division *Chlorophyta*; and (2) subdominant or rarely encountered taxa comprising microalgal strains from *Chlorophyta, Baccillariophyta, Euglenophyta, Cryptophyta, Chrysophyta*, and/or *Pyrrhophyta*, and in some embodiments, from *Cyanophyta*. In one aspect of the invention, an assemblage of microorganisms is provided comprising the following microalgal composition: (1) dominant taxa accounting for more than 50%, 55%, 60%, 65%, 70%, 75%, 80%, or 85% of the biomass from the division *Chlorophyta* selected from, but not limited to: *Micractinium Carteria, Ankistrodesmus, Scenedesmus, Ulothrix, Dictyosphaerium, Chlorococcaceae, Golenkinia, Cosmarium, Dimorphococcus, Pediastrum, Stigeoclonium, Chlamydomonas, Pandorina*, and/or *Monoraphidium* species; (2) subdominant taxa comprising microalgal strains from: *Chlorophyta* including *Ankistrodesmus, Scenedesmus*; and Diatoms including, but not limited to: *Fragilaria, Nitzschia, Navicula, Achnanthes, Amphora*, and/or *Gomphonema*; (3) rarely encountered taxa comprising microalgal strains from *Chlorophyta* including *Scenedesmus, Ulothrix*; Diatoms including *Synedra*; *Cyanophyta* including *Merismopedia, Lyngbya, Oscillatoria, Chroococcus*, and/or *Pseudanabaena*; and *Pyrrhophyta* including *Peridinium* and/or *Gymnodinium*. In one aspect of the invention, an assemblage of microorganisms is provided comprising the following microalgal composition: (1) dominant taxa accounting for more than 80% of the biomass from the division *Chlorophyta* selected from *Micractinium pusillum* and *Carteria* spp.; (2) subdominant taxa comprising microalgal strains from: *Chlorophyta* including *Ankistrodesmus falcatus, Scenedesmus* spp.; and Diatoms including *Fragilaria construens f.* venter, *Nitzschia*; (3) rarely encountered taxa comprising microalgal strains from *Chlorophyta* including *Scenedesmus dimorphus, Ulothrix* spp.; Diatoms including *Synedra ulna; Cyanophyta* including *Merismopedia tenuissima*; and *Pyrrhophyta*, including *Peridinium* spp. The assemblage of the present invention can be provided in any suitable culture medium for growth of the microalgae, including in any growth medium described herein.

Description of Preferred Microalgal Growth Conditions

The growth medium (e.g., nutrients or nutrient source) used in the process of the present invention can be any medium suitable for culturing microalgae or for aquaculture use, and is preferably an inorganic growth medium. According to the present invention, a suitable growth medium generally comprises a source of assimilable nitrogen and appropriate salts and/or trace metals. The medium can, in some embodiments, also include an assimilable source of carbon, to form an organic medium. In one aspect, the medium is suitable for growing and maintaining a substantially pure culture of the microalgae of the present invention (e.g., substantially free of contaminating microorganisms and/or impurities that might negatively impact the growth of the microorganisms). In another aspect, the medium is suitable for growing and maintaining the microalgae for use in a remediation process, wherein growth of other microorganisms (e.g., bacteria useful in remediation) can occur.

Sources of assimilable nitrogen which can be used in a suitable primary growth medium include, but are not limited to, simple nitrogen sources, organic nitrogen sources and complex nitrogen sources. Such nitrogen sources include anhydrous ammonia, ammonium salts and substances of animal, vegetable and/or microbial origin. Suitable nitrogen sources include, but are not limited to, protein hydrolysates, microbial biomass hydrolysates, peptone, yeast extract, ammonium sulfate, sodium nitrate, urea, and amino acids.

The effective growth medium can contain other compounds such as inorganic salts, vitamins, trace metals and/or growth promoters. Such other compounds can also be present in carbon, nitrogen or mineral sources in the effective medium or can be added specifically to the medium. The growth medium can also contain a suitable phosphate source, including both inorganic and organic phosphate sources.

Sources of assimilable carbon which can be used in a suitable growth medium include, but are not limited to, sugars and their polymers, including, dextrin, sucrose, maltose, lactose, glucose, fructose, mannose, sorbose, arabinose and xylose; fatty acids; organic acids such as acetate; primary alcohols such as ethanol and n-propanol; and polyalcohols such as glycerine. The concentration of a carbon source, such as glucose, in the fermentation medium should promote cell growth, but not be so high as to repress growth of the microalgae.

A preferred growth medium useful for culturing microalgae of the present invention is any art recognized or known medium for culturing microalgae such as any medium based on Walne's medium (comprising $FeCl_3$, $MnCl_2$, $H_3BO_3 \cdot 4H_2O$, EDTA, $NAH_2PO_4 \cdot 2H_2O$, $NaNO_3$, $ZnCl_2$, $CoCl_2 \cdot 6H_2O$, $CuSO_4 \cdot 5H_2O$, conc. HCl, Vit. B1, Vit. B12) or Guillard's 1975 F/2 algae medium (comprising $NaNO_3$, $NaH_2PO_4 \cdot H_2O$, $Na_2SiO_3 \cdot 9H_2O$, $Na_2EDTA$, $CoCl_2 \cdot 6H_2O$, $CuSO_4 \cdot 5H_2O$, $FeCl_3 \cdot 6H_2O$, $MnCl_2 \cdot 2H_2O$, $Na_2MoO_4 \cdot 2H_2O$, $ZnSO_4 \cdot 7H_2O$, Thiamin HCl, Biotin, Vit. B12). There are many commercially available media based on these formulas, such as Pro•Culture A & B Professional F/2 Algal Culture Formula (Kent Marine®, Marietta, Ga.), which is based on Guillard's F/2 algal medium. This medium includes: iron EDTA, manganese EDTA, sodium EDTA, $CoCl_2$, zinc EDTA, copper EDTA, sodium molybdate, sodium nitrate, monosodium phosphate, thiamine HCl (vitamin B1), vitamin B12 and biotin.

The growth medium is typically added to the fermentation tanks (i.e., the microalgae growth tanks) at a concentration recommended by the manufacturer of the growth medium stock for the total volume of culture medium in the growth tank, and/or as determined daily based on the growth rate and nutrient needs of the microbial culture in the growth tank. For example, from a standard growth medium stock Pro•Culture A & B Professional F/2 Algal Culture Formula (Kent Marine®, Marietta, Ga.), one would typically add from about 8 ounces to about 16 ounces (by volume) Pro•Culture A & B Professional F/2 Algal Culture Formula (Kent Marine®, Marietta, Ga.) per 1000 gallons total volume culture medium in the growth tank per day, or any suitable amount in between, in increments of 0.1 ounce, to achieve a concentration of growth medium per 1000 gallons that adequately supports the growth of the microbial culture in the growth tank. In one embodiment, the total amount of growth medium per day is added incrementally throughout the day. For example, a portion of the total amount of the growth medium to be delivered on a given day can be added in the morning, at mid-day, and again in the evening. A larger portion of the total amount would typically be added to the growth tanks in the morning (e.g., about 50–70% of the total daily amount), with the smallest portion of the total amount being added in the evening (e.g., about 5–15%), prior to the rest period for the culture (i.e., period of darkness). One of skill in the art will appreciate that the amount of growth medium (nutrients) to be added to the growth tank per day and per individual feeding can vary depending on the growth of the microalgae, as well as other factors, including but not limited to, amount of light provided, pH of the culture, temperature of the culture, dissolved oxygen in the culture, the frequency with which portions of the culture are distributed to the waste water ponds, and the like. It is well within the ability of those of skill in the art, particularly given the guidance provided herein, to monitor the growth tank cultures and adjust the amount of growth medium added to the tanks accordingly.

As described above, in addition to being fed with the growth medium stock, the fermentation medium in the growth tanks can be further supplemented with waste water from the waste water source being treated, which provides additional nutrients to the growth tank to support the microalgae. As the waste water becomes cleaner as a result of the microalgal treatment, the amount of growth medium stock can be adjusted in the growth tanks as necessary to maintain the microalgal growth.

Over time, as the microalgal assemblage of the present invention grows in a growth tank culture that is fed, at least in part, using waste water from the waster water source to be treated, the present inventors believe, without being bound by theory, that the assemblage will adapt to the waste water source and develop a balance of microorganisms within the assemblage that is particularly well suited for growth on that particular waste water source. As such, one assemblage may develop over time that grows especially well on bovine waste and another assemblage may develop that grows especially well on human waste. Further, assemblages that grow particularly well on one specific site versus another (e.g., one porcine waste source versus a different porcine waste source) can be developed.

The water used to make up the volume of the fermentation medium in the growth tank to which the primary growth medium stock, supplemental food source, and/or waste water from the remediation source are added can be from any source, including, but not limited to, well water, tap water, purified water, and deionized water. This water should be free from agents that are toxic or inhibitory to the growth of the microalgae, and preferably, is low in chlorine.

The temperature of the medium in the growth tanks is preferably maintained at from about 70° to about 90° F. (~20° to ~33° C.), and typically, the temperature is maintained at a range of from about 75° to about 85° F. (~24° to ~29.5° C.).

The pH of the growth tank is maintained at between about pH 7.5 to about pH 9.4 for optimum growth and health of the microalgae, and more preferably, between about pH7.5 and about pH9.0. It is preferable to maintain the culture within this pH range and monitor the tank to achieve a dissolved oxygen concentration of from about 5 mg dissolved oxygen per liter medium (~5 mg/L) to about 25 mg/L (e.g., 5 mg/L, 10 mg/L, 15 mg/L, 20 mg/L, 25 mg/L and whole integers in mg/L between these points). The growth tank can be allowed to exceed 25 mg/L dissolved oxygen, but monitoring of the tank should continue to ensure the health of the biological system. If the growth tank drops below or above this level of dissolved oxygen, the conditions in the tank are corrected, such as by adding more or less growth medium stock to boost or reduce the algal growth, respectively; or by emptying more or less of the tank volume (or emptying more or less often) into the waste water source to reduce or increase the total algal concentration in the growth tank.

The culture medium is exposed to a source of light for between about 16 and about 22 hours per day, and preferably between about 18 hours and about 20 hours per day (e.g., the culture is in darkness for at least about 2 hours per day, and up to about 8 hours per day, with between about 4 hours and about 6 hours of darkness per day being particularly preferred). In one embodiment, the culture is supplied with natural sunlight, such as in a green house, and supplemented with artificial light as needed to make up the required amount of light every 24 hours. The source of artificial light can be any suitable source, and is preferably a source which provides light that mimics natural sunlight. In one embodiment, a light source providing blue spectrum ultraviolet light is used.

The microalgae of the present invention are initially added to the growth tanks (~1000 gallons total culture medium) as an inoculum of from about 5 to about 200 gallons of a "starter culture". The starter culture is prepared by growing microalgae of the present invention in a smaller volume of culture medium that is substantially similar to that used in the large growth tanks, wherein the microalgae reach a density measured as turbidity in the medium of from about 5 ntu to about 20 ntu before being added to the large growth tanks (or that is any suitable microalgae culture medium). Preferably, the microalgal culture is grown to a turbidity of about 20 ntu or greater, at a pH range of from about pH7.5 to about pH9.0 (and not greater than pH9.4), with the higher pH range being preferred to establish the microalgae in the growth tank. Typically, a period of about three days is required to establish a sufficient concentration of microalgae in the large, 1000 gallon growth tanks under controlled environmental conditions.

Once the culture is established in the growth tanks, it is preferable to maintain the culture at a density sufficient to maintain the dissolved oxygen concentration in the fermentation medium at a level of from about 5–10 mg dissolved oxygen per liter medium (~5–10 mg/L) to about 25 mg/L, at a pH of between about pH 7.5 to about pH 9.0. Preferably, the microalgae are cultured at a density sufficient to maintain the dissolved oxygen content at up to about 25 mg/L and at a pH of up to about 9.0. The dissolved oxygen content may be allowed to exceed 25 mg/L, but the pH generally should not be allowed to exceed pH 9.4. The density, dissolved oxygen and pH of the culture medium can be regulated by several factors including, but not limited to, the rate of turn-over of the growth tank culture into the waste water source, and the rate of addition and/or concentration of growth medium, supplemental food source and/or waste water added to the growth tanks.

The following examples are provided illustrating the both the system and method of this invention in practice:

EXAMPLE 1

Pond #1 is 100'×225'×12' with a capacity of 6 acre feet. Four swine confinement buildings (slatted floor, pull pit), with a total one time capacity of 3,600 head, drain into this receiving pond on a weekly basis. The average BOD concentration of the waste stream is 18,900 mg/L, the NH3-N measurement is 1,280 mg/L, and the concentrated dissolved oxygen is 0.06 mg/L. The surface area prior to treatment was completely crusted and thick enough (18–24") to allow a person to walk across. The bottom sludge had built up to a depth of 8' with free flowing liquid depth of 2–2.5' under the crust. Maintaining a continuing flow from the discharge point into the next settling pond became a weekly maintenance issue due to the heavy crust and sludge buildup.

Post treatment results after the daily delivery of the microalgal culture, were dramatic. Within 12 months, the surface was over 95% free of crust. The bottom sludge has been reduced to a soft slurry that continues to break down; and, there is over 8' of free flowing liquid. The discharge outlet is open and does not require attention from on site labor. The outlet wastewater stream into the next holding pond demonstrates a 50% reduction of BOD and NH3-N concentrations with dissolved oxygen readings greater than 2.0 mg/L. A boat can now be used to measure bottom slurry levels and obtain grab samples of pond wastewater from various locations. The pre and post treatment samples were analyzed and reported by a state certified laboratory. Dissolved oxygen readings were obtained using accepted wastewater industry monitoring equipment by on site personnel. The remediation of this pond from an organically burdened anaerobic status to an open, free flowing, odorless aerobic status has taken place during all climatic conditions (−10 degrees F. to 100 degrees F.) over a 12 months treatment period.

EXAMPLE 2

Pond #3 is 80'×320'×15' with a capacity of 9 acre feet. Four swine confinement buildings (flush gutter), with a total one time capacity of 3,600 head, drain into this receiving pond on a daily basis. The pond has been mechanically cleaned twice since 1970 to remove all the organic sludge that clogged the pond. The daily BOD load is approximately 7260 mg/L, and the dissolved oxygen concentration is $\leq 0.05$ mg/L. Prior to treatment, the surface area was completely crusted and would not permit a boat to be used for grab samples anywhere on the pond. The outlet discharge point to the next holding pond had to be relocated 200' closer to the inlet receiving point due to sludge and crust buildup that prevented free flow to the original outlet point. After 8 months of daily treatment of the microalgae which included the four winter months of November, December, January, and February, the surface area crust has been reduced by 50%. The farthest, original discharge outlet into the next holding pond has opened to allow free flow of liquid. Bottom digestion indicated by "surface bubbling" and free floating material has been observed daily, even during cold winter periods. Dissolved oxygen concentrations of $\leq 1.2$ mg/L have been measured at the outlet points and in the open surface areas. Grab samples for continuing analysis can be obtained with a boat by on site personnel. Pre and post wastewater samples were analyzed and reported by a state certified laboratory. Dissolved oxygen readings were obtained using accepted wastewater industry monitoring equipment by on site personnel. Within the 12 month treatment protocol, this receiving pond has changed from an anaerobic to an aerobic status.

Figure 3:
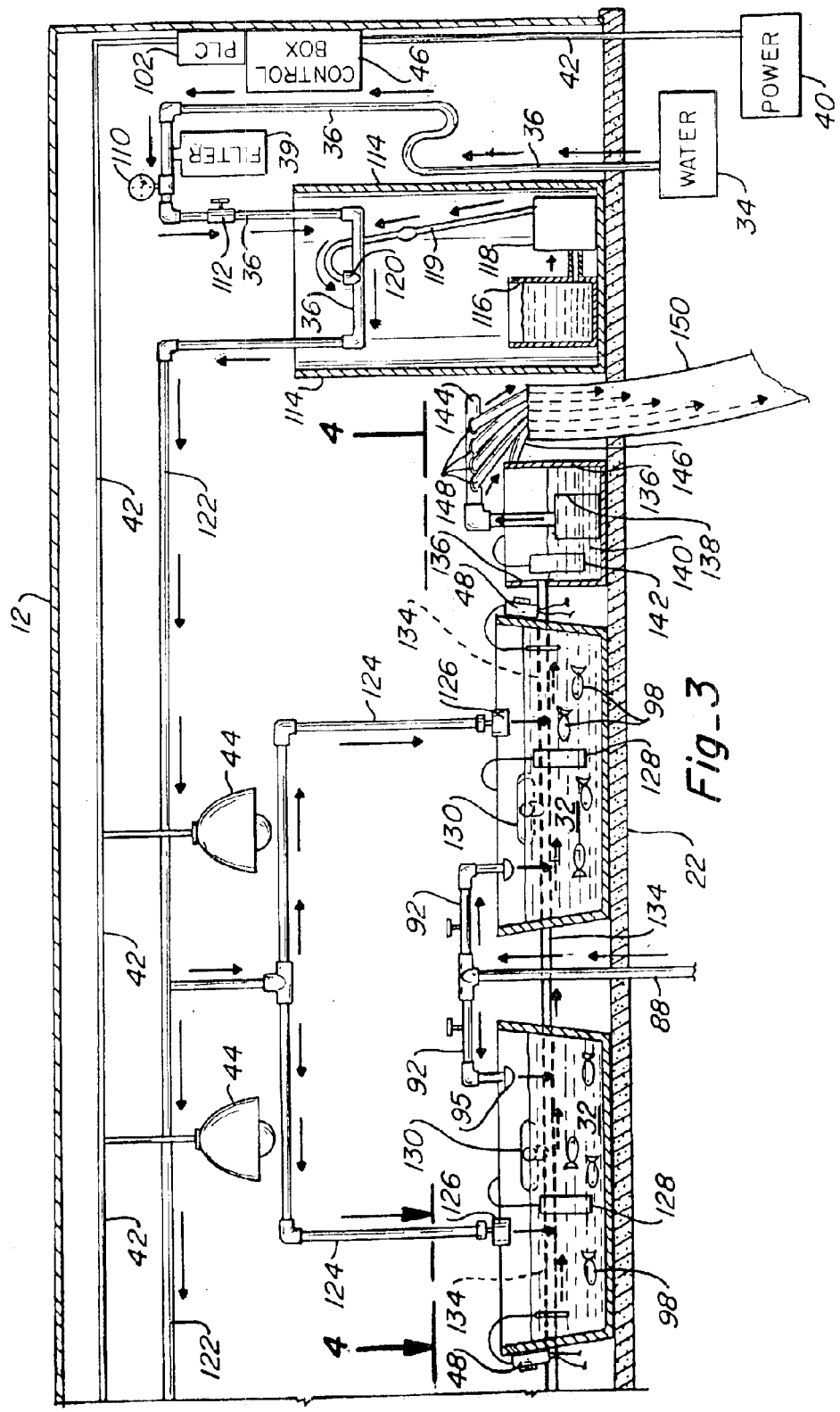
FIGS. 3 and 4 are schematic diagrams illustrating another preferred embodiment of the system of the present invention, to include the various components used therein.
Figure 4:
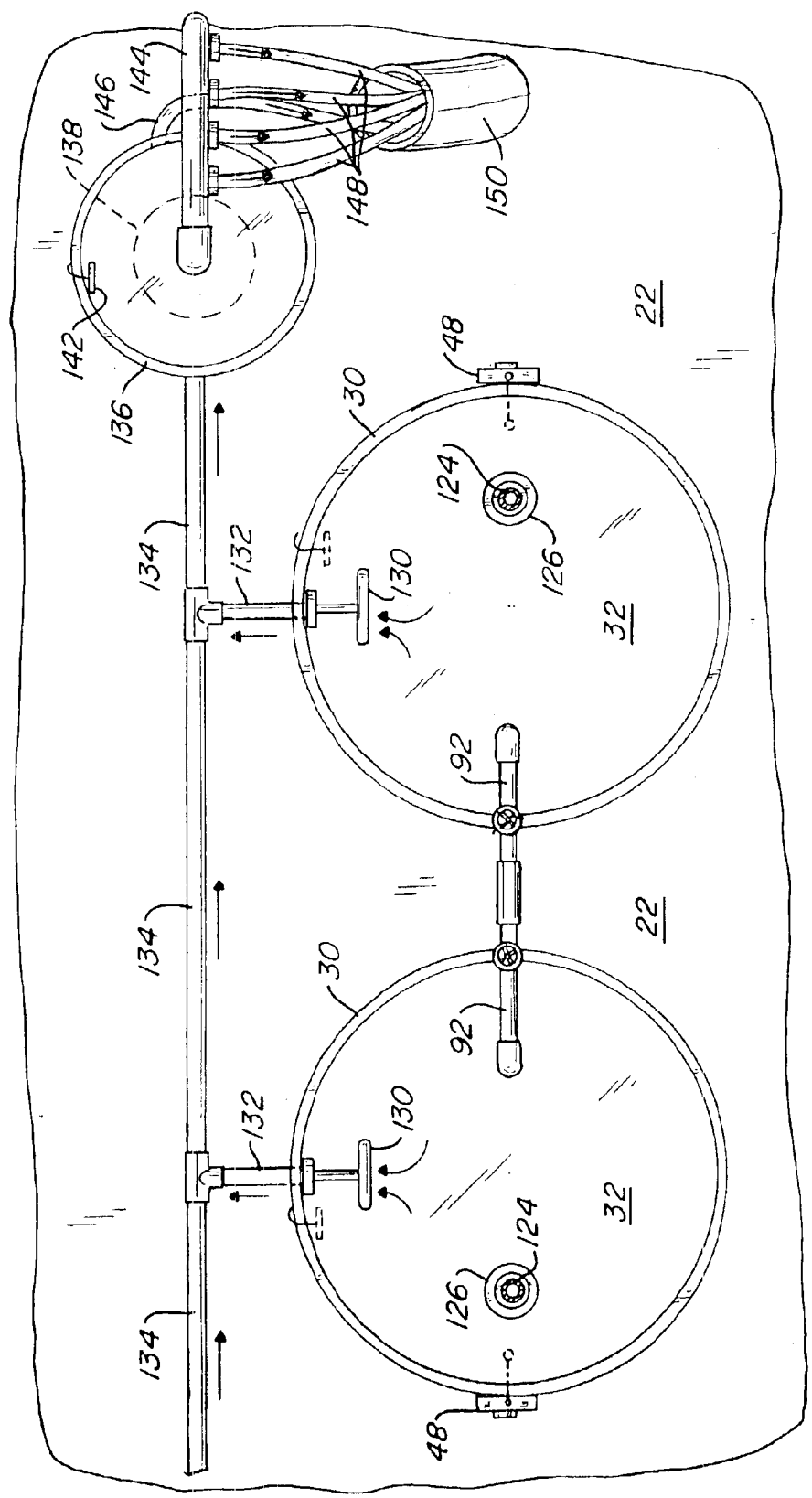

FIGS. 3 and 4 illustrate an alternate embodiment of the present invention. Like reference numbers used in these Figures denote the same elements discussed above with respect to the first preferred embodiment. Referring first to FIG. 3, the incoming water line 36 may have a pressure regulator 110 which very precisely controls the amount of liquid passing therethrough, and check valve 112 will prevent reverse flow in the event there is loss of pressure in the line 36. In lieu of the food storage tank and related elements discussed above, the second embodiment may utilize an alternate system for providing nutrients to the tanks 30. A separate cabinet 114 may house a nutrient storage container 116 which stores a desired quantity of nutrients, typically in the form of inorganic materials which may be dissolved in water. Cabinet 114 provides an additional insulating structure to ensure the nutrients in solution are kept at a desired temperature. A pre-mixed amount of dissolved nutrients are placed in the storage container. The nutrient storage container delivers its nutrients by pump 118 through transfer line 119 directly into main water line 36 which traverses through the cabinet 114 as shown. An injector nozzle 120 periodically injects the appropriate amount of nutrients into line 36 which then are carried by lines 122 and 124 to the culture tanks. The nozzle 120 may be controlled as by a timer (not shown) in the PLC 102 that is programmed to cause the nozzle to deliver the nutrient at the desired time and quantity. The distribution lines 124 preferably are of equal length for all of the tanks so that there would be the same delivered amount of nutrients to each of the tanks due to the pulsed or periodic introduction of nutrients in line 36.

An orifice 126 attaches to the free end of each of the lines 126 allowing delivery of water and nutrients to the tanks 30.

The tanks may be heated by immersion type heaters 128 which are placed in the tanks. Thermostats 48 electrically connect to the heater and control the amount of heat delivered to the tanks. Immersion heaters are simple and reliable solutions for heating the tanks, and may be replaced or repaired as necessary, and also may be sized to provide the desired heat transfer for a particular sized tank.

In order to remove culture from the tanks for subsequent delivery to a waste site, each of the tanks incorporate a gravity feed system including a collection filter 130 which allows liquid to flow therethrough to an intermediate transfer line 132 which connects to main transfer line 134. For gravity flow, line 134 would be placed at a height lower than the height of the liquid 32 in the tanks. Transfer line 134 would then transfer the culture laden fluid to a culture holding tank 136. Within culture holding tank 136, a culture pump 138 is placed for pressurized delivery of the culture laden liquid 140 to the desired waste site. The primary purpose of the culture holding tank 136 is to provide a continual source of culture that will allow culture pump 138 to vary the rate at which culture laden liquid may be delivered to the waste site. It is possible to place pump 138 directly within one of the tanks, and then directly pump the culture laden fluid to a waste site; however, retrieving culture laden liquid from the top surface of the tanks and then transporting the liquid to another container allows settling of any solids which may be found in the culture laden liquid. Additionally, cleaning and upkeep of the tanks is simplified if pumps and associated piping are not placed within the culture tanks. A liquid level control 142 monitors the liquid level of the culture laden liquid 140 in the tank 136 to ensure that the culture pump 138 has a continual source of liquid. A manifold 144 receives flow from the culture pump 136, the manifold 144 allowing multiple culture lines 148 to deliver culture to one or more waste site locations. An overflow line 146 communicates with the top edge of the tank 136 allowing drainage of the tank 136 in the event that liquid level control 142 fails to shut the pump 138 off in a high level situation. The overflow line 146 would simply transfer the culture laden liquid to a desired waste site.

Now referring to FIG. 4, the plan view thereof illustrates transfer of the culture laden liquid from the tanks 30 through lines 132 and 134 into the holding tank 136. The other elements are also shown which allow transfer of the culture laden liquid through lines 148 to the desired waste sites. Optionally, a protective conduit 150 may be used to house the plurality of culture lines 148 as they extend to the respective waste site(s).

Now referring to FIG. 5, one example of a waste pond/lagoon 160 is shown which may be remediated by the culture laden liquid. FIG. 5 exemplifies a larger waste pond/lagoon which may necessitate distribution of the culture laden liquid at various locations within the waste pond thereby ensuring uniformity of transfer of the culture laden liquid. As shown, multiple culture lines 148 are distributed in the waste pond 160, and each of the culture lines 148 deliver culture laden liquid to various locations within the waste pond. The culture lines are open at their ends, and screens 162 may cover the open ends preventing migration of solids into the lines. Effluent in-flow is shown at line 164, and the waste pond 160 may also be provided with a recirculation line 168 which connects to pump 169. Pump 169 transfers effluent back into effluent in-flow line 164 thereby assisting in circulation of liquid through the waste pond. Optionally, one or more mechanical agitating devices 166 may be placed in the pond to enhance circulation within the pond. As mentioned above, rotary or impeller type mechanical agitators may be provided, or bubble diffusers may also be used.

FIG. 6 illustrates another example of the type of waste site which may be remediated with the present invention. FIG. 6 exemplifies a waste site comprising multiple lagoons or ponds which receive effluent in a series flow beginning with pond/lagoon 170, pond/lagoon 172, and then finally pond/lagoon 174. Effluent inflow occurs at effluent inlet line 176, and the outlet of the liquid is at line 178. Typically, liquid leaving line 178 has been treated to a desired extent and is then reused for a commercial purpose such as wash down water for washing animal stalls. Intermediate transfer lines 180 allow transfer between the separate ponds. FIG. 6 illustrates a single culture line 148 which provides the desired quantity of culture laden liquid to the first pond 170. The flow of liquid through the ponds also carries the culture laden liquid to each of the ponds thereby ensuring that there is adequate distribution of the culture.

EXAMPLE 3

The microalgal culture of the invention was originally isolated from small pond fed by water from a fresh water spring in the United States of America. The culture has been maintained in various growth culture tanks in different waste remediation projects using a remediation system according to the invention, as well as in separate cultures. The primary growth media fed to the cultures has been an organic medium based on fermented animal wastes and subsequently an inorganic commercial medium, such as Pro•Culture A & B Professional F/2 Algal Culture Formula (Kent Marine®, Marietta, Ga.), described previously herein.

Aquatic samples of microbial cultures that had been established in the growth tanks fed with Pro•Culture A & B Professional F/2 Algal Culture Formula (Kent Marine®, Marietta, Ga.) inorganic medium and used in the remediation systems described herein have been analyzed for the algal constituents contained within the assemblage. Samples were tested within a short period after removal from the growth tanks, as well as over time in laboratory cultures on the inorganic growth medium. Results showed that the microbial cultures in the growth tanks were primarily microalgal and were quite stable in that a balance of dominant, subdominant and more rare algal species had established where there did not appear to be significant ongoing divergence of species within the cultures. The microalgae in the cultures were all well known in the art and are publicly available through a variety of public depositories.

Briefly, algae grown in the inorganic medium contain a variety of divisions representing the *Chlorophyta* (Green algae), *Bacillariophyta* (Diatoms), *Cyanophyta* (Blue-green algae), *Pyrrhophyta* (Dinoflagellates), *Euglenophyta*, *Cryptophyta*, and/or *Chrysophyta*. The inorganic growth medium is high in inorganic nitrogen and the dominant algae reflect taxa that grow well in the presence of high concentrations of inorganic nitrogen. Dominant taxa include, but are not limited to, the Green algae *Micractinium pusillum* (colonial, non-motile) and *Carteria* spp. (single cell, motile). Both dominant taxa accounted for over 80% of the biomass and are routinely seen in systems where the nitrogen to phosphorus ratio is high, and where the absolute concentration of inorganic nitrogen in high. Subdominant taxa include the following Green algae: *Ankistrodesmus falcatus* (single cell, non-motile), several species of *Scenedesmus* (colonial, non-motile), and the following Diatoms: *Fragilaria construens* f. venter (single cell, non-motile) and several species of *Nitzschia* (single cell, motile). Rarely encountered taxa represented the Green algae: *Scenedesmus dimorphus* (colonial, non-motile) and *Ulothrix* (filamentous, non-motile); the Diatoms: *Synedra ulna* (single cell, non-motile); the Blue-green algae: *Merismopedia tenuissima* (colonial, non-motile, non-nitrogen fixing); and the Dinoflagellates: *Peridinium* spp. (single cell, motile).

Aquatic samples of the microbial cultures established in the growth tanks fed with an organic medium comprising animal waste products, in addition to some organic waste material recycled from the treatment ponds, have also been analyzed for the algal constituents contained within the microbial assemblage. Results regarding the types and stability of algae present in the tanks were similar to those described above for the inorganic medium, but the assemblages fed by inorganic medium added to the growth tanks (plus some organic waste material recycled from the treatment ponds) are more stable in terms of proportions of dominant and subdominant taxa in the assemblage, require less medium for good growth, and are at less risk of contamination from the food source. Therefore, algal cultures fed on an inorganic or other suitable commercial or controlled medium source are preferred.

In subsequent experiments, samples from several different remediation sites and growth tanks were sampled and cultured over several weeks. The composition of the assemblages was found to be relatively stable and in each of the tanks, a predictable assemblage of dominant or co-dominant species was established. The dominant algal species in all growth tanks tested are members of the *Chlorophyta* (Green algae). The *Cyanophyta* (Blue-green algae) in the tanks are not water quality related species. The assemblages were comprised of various combinations of the divisions, genera and species listed in Table 2. Some dominant *Chlorophyta* genera in the tanks included, but were not limited to: *Ankistrodesmus, Micractinium, Scenedesmus, Pandorina, Chlamydomonas, Gonium, Carteria*.

A summary of the algal divisions, genera and species found in any of the samples tested from the growth tanks (organic and inorganic) is provided in Table 2.

TABLE 2

| Genus | Species |
|---|---|
| Division: Bacillariophyta | |
| Fragilaria | construens |
| Navicula | sp. |
| Nitzschia | spp |
| Nitzschia | amphibia |
| Nitzschia | palea |
| Synedra | cyclopum |
| Synedra | tenera |
| Synedra | ulna |
| Achnanthes | spp |
| Amphora | sp |
| Gomphonema | spp |
| Division: Chlorophyta | |
| Chlorococcaceae | spp |
| Ankistrodesmus | falcatus |
| Carteria | spp |
| Chlamydomonas | spp |
| Cosmarium | spp |
| Dictyosphaerium | pulchellum |
| Dimorphococcus | lunatus |
| Golenkinia | radiata |
| Micractinium | pusillum |
| Pediastrum | boryanum |
| Scenedesmus | abundans |
| Scenedesmus | bijuga |
| Scenedesmus | dimorphus |
| Scenedesmus | opoliensis |
| Scenedesmus | quadricauda |
| Scenedesmus | serratus |
| Stigeoclonium | spp |
| Ulothrix | spp |
| Gonium | spp |
| Monoraphidium | spp |
| Pandorina | spp |

TABLE 2-continued

| Genus | Species |
|---|---|
| Division: Cyanophyta | |
| Lyngbya | subtilis |
| Merismopedia | tenuissima |
| Oscillatoria | spp |
| Oscillatoria | amphibia |
| Oscillatoria | tenuis |
| Chroococcus | spp |
| Pseudanabaena | spp |
| Division: Euglenophyta | |
| Euglena | gracilis |
| Division: Cryptophyta | |
| Cryptomonas | spp |
| Rhodomonas | spp |
| Division: Chrysophyta | |
| unknown | spp |
| Division: Pyrrhophyta | |
| Peridinium | spp |
| Gymnodinium | spp |

The advantages of the current invention are clear. A simple structure may be provided for controlling environmental conditions. Processing equipment used to support growing of the culture is also simple, and can easily be housed within a modest sized structure. Once the system has achieved equilibrium after startup, minimum intervention is required to keep the system running efficiently. A continual supply of culture can be transferred to the waste site for extended periods of remediation. The aerobic treatment of the waste provides an environmentally friendly solution as compared to nonaerobic processes. The system is flexible in design because it may be sized to accommodate the waste site to be treated. The system is also flexible in terms of the extent to which it may be desired to automate control of the system.

The invention has been described with reference to preferred embodiments herein; however, it shall be understood that various modifications can be made within the spirit and scope of the invention.

What is claimed is:

1. A system for remediating waste, to include animal waste produced from agricultural operations, said system comprising:
   a structure having an exterior made of translucent material allowing sunlight to pass therethrough;
   at least one production tank positioned within the structure, said production tank having a predetermined volume of water therein set at a desired temperature range;
   means for delivering nutrients to the tank for nourishing a culture of microorganisms placed in the tank for culturing;
   means communicating with the tank for monitoring the temperature of the water; and
   means communicating with the production tank for delivering the culture to a waste site for remediation of the waste site.

2. A system, as claimed in claim 1, wherein:
   said structure includes at least one vent for controlling the temperature within the structure.

3. A system, as claimed in claim 1, wherein:
   said structure is in the form of a greenhouse.

4. A system, as claimed in claim 1, wherein:
said system further includes means communicating with the tank for monitoring oxygen levels in said tank to determine if the culture is metabolizing at desired levels.

5. A system, as claimed in claim 1, wherein:
said means for delivering nutrients includes at least one pipeline, and a nozzle communicating with the pipeline to meter flow of the nutrients into said at least one production tank.

6. A system, as claimed in claim 1, further including:
means for delivering water to the tank from a water supply, said means for delivering water further including a temperature controller placed in line with the water supply for controlling the temperature of the water supplied to the at least one production tank.

7. A system, as claimed in claim 1, further including:
fish placed in the at least one production tank to provide a visual monitor of dissolved oxygen within the tank.

8. A system, as claimed in claim 1, further including:
an artificial light source placed within the structure to provide additional light as required for optimum growth of the culture.

9. A system, as claimed in claim 1, wherein:
said culture is a culture comprising microalgae.

10. A system, as claimed in claim 1, wherein said culture comprises microalgal species from at least one division of microalgae selected from the group consisting of *Chlorophyta*, *Bacillariophyta*, *Cyanophyta*, and *Pyrrhophyta*.

11. A system, as claimed in claim 1, wherein said culture comprises microalgal species from at least one division of microalgae selected from the group consisting of *Chlorophyta* and *Bacillariophyta*.

12. A system, as claimed in claim 1, wherein said culture comprises microalgal species selected from at least one genus of microalgae selected from the group consisting of *Micractinium, Carteria, Ankistrodesmus, Scenedesmus, Ulothrix, Dictyosphaerium, Chlorococcaceae, Golenkinia, Cosmarium, Dimorphococcus, Pediastrum, Stigeoclonium, Chiamydomonas, Fragilaria, Navicula, Nizschia, Synedra, Pseudanabaena, Lyngbya, Merismopedia, Oscillatoria* and *Peridinium*.

13. A system, as claimed in claim 1, wherein at least about 80% of the biomass in said culture comprises microalgal species from *Chiorophyta*.

14. A system, as claimed in claim 1, wherein:
said means for delivering the culture to a waste site includes a plurality of pipelines which each carry the culture, and the pipelines being spaced from one another at the waste site to assist in uniform dispersion of the culture at the waste site.

15. A system, as claimed in claim 1, further including:
means for mechanically agitating waste at the waste site thereby enhancing dispersion of the culture at the waste site.

16. A system, as claimed in claim 15, wherein:
said means for agitating includes a mechanically driven impeller.

17. A system, as claimed in claim 15, wherein:
said means for agitating includes a diffusion plate which produces a continuous stream of bubbles in the waste.

18. A method of remediating waste, to include animal waste produced from agricultural operations, said method incorporated within a system of remediation, said method comprising the steps of:

providing at least one production tank with water therein set at a desired temperature range;
introducing a microbial culture into said production tank;
introducing food/nutrients into the production tank for growing the culture;
controlling heat conditions so that the culture grows at a desired rate within the culture tank;
controlling light conditions to optimize growth of the culture within the tank;
monitoring oxygen levels within the tank for optimizing growth of the culture;
delivering the culture through a delivery line to a waste site to be remediated, said production tank being placed adjacent the waste site at a convenient location;
continuing to replenish water and nutrients in the culture tank thereby maintaining a viable population of the microorganisms within the culture tank;
continuing to deliver the culture through the delivery line to the waste site at a desired steady rate according to the remediation requirements for the waste site and the capacity of the production tank; and
producing aerobic remediation within the waste site by interaction of the culture which consumes the waste and produces oxygen.

19. A method, as claimed in claim 18, further comprising the step of:
providing a translucent structure housing the at least one production tank thereby assisting in temperature control of the tank.

20. A method, as claimed in claim 18, wherein:
said culture is a culture comprising microalgae.

21. A method, as claimed in claim 18, wherein:
said second introducing step is achieved by introducing waste from the waste site into the production tank at metered amounts to optimize growth of the culture.

22. A method, as claimed in claim 18, wherein:
said waste from the waste site is delivered to the production tanks as by a pipe interconnecting the waste site and the production tank.

23. A method, as claimed in claim 18, wherein:
said second introducing step, said controlling steps, and said monitoring step are controlled by a programmable logic controller which receives inputs from parameters of the system to include a measure of nutrients in the production tank, the temperature of the production tank, the oxygen level within the production tank, and the number of hours of light to which the production tanks are exposed, said PLC then producing parameter outputs to maintain the system for optimal growth conditions of the culture.

24. A method, as claimed in claim 23, wherein:
said delivering step occurs by gravity flow of the culture to the waste site.

25. A method, as claimed in claim 23, wherein:
said delivering step occurs by pumping the culture to the waste site.

26. A method, as claimed in claim 23, wherein:
the delivery line includes a plurality of delivery lines which introduce the culture to the waste site at selected locations within the waste site to assist in uniform dispersion of the culture at the waste site.

27. A method, as claimed in claim 23, further including the step of:
mechanically agitating waste at the waste site to assist in uniform dispersion of the culture at the waste site.

28. A method, as claimed in claim 23, wherein:
said waste site includes a plurality of separate waste ponds interconnected in series so that culture is introduced at a first pond, and culture is carried downstream to subsequent ponds thereby resulting in introduction of culture to all the ponds.

29. A system for remediating waste, to include animal waste produced from agricultural operations, said system comprising:
a structure having an exterior made of translucent material allowing sunlight to pass therethrough, said structure including at least one opening formed therein for controlling the temperature within the structure;
at least one production tank positioned within the structure, said production tank having a predetermined volume of water therein and set at a desired temperature range;
a nutrient tank for holding nutrients to be supplied to the at least one production tank, said nutrient tank including a pump positioned therein for delivering nutrients to the production tank;
means for delivering water to the at least one production tank, said means for delivering including an inline heater for heating the water delivered to the production tank in order to maintain the water in the tank at the desired temperature range;
a microorganism placed in the production tank, said microorganism comprising a remediating culture to be delivered to a waste site for remediation of the waste site wherein the production tank and the nutrients delivered thereto provide a medium for growth and colonization of the microorganism;
means communicating with the production tank for delivering the culture to the waste site; and
an artificial light source placed within the structure to provide additional light as required for optimum growth of the culture.

30. A system, as claimed in claim 29, wherein:
said structure is in the form of a greenhouse.

31. A system, as claimed in claim 29, wherein:
said system further includes means communicating with the at least one production tank for monitoring oxygen levels in said at least one production tank to determine if the culture is metabolizing at desired levels.

32. A system, as claimed in claim 29, further including:
fish placed in the at least one production tank to provide a visual monitor of dissolved oxygen within the tank.

33. A system, as claimed in claim 29, wherein:
said culture produces high amounts of oxygen used to remediate the waste through an aerobic process.

34. A system, as claimed in claim 29, further including:
means mounted in said nutrient tank for agitating nutrients in said nutrient tank to prevent settling and separation of the nutrients.

35. An assemblage of microalgae for waste remediation, wherein at least about 60% of the biomass in said assemblage consists of microalgae consisting of *Micractiniumpusillum* and *Carteria* spp., and wherein said assemblage further comprises microalgal strains selected from: *Ankistrodesmusfalcatus, Scenedesmus* spp., *Fragilaria construens, Nitzschia* spp., *Scenedesmus dimorphus, Ulothrix* spp., *Synedra ulna, Merismopedia tenuissima*, and *Peridinium* spp.

36. An assemblage of microalgae, as claimed in claim 36, wherein at least about 70% of the biomass in said assemblage consists of niicroalgae consisting of *Micractinium pusillum* and *Carteria* spp.

37. An assemblage of microalgae, as claimed in claim 36, wherein at least about 80% of the biomass in said assemblage consists of microalgae consisting of *Micractiniumpusillum* and *Carteria* spp.

38. A method of remediating waste, said method comprising delivering an assemblage of microalgae to a waste site to be remediated, to produce aerobic remediation within the waste site by interaction of the microalgae which consumes the waste and produces oxygen, wherein at least about 60% of the biomass in said assemblage consists of microalgae consisting of *Micractinium pusillum* and *Carteria* spp., and wherein said assemblage further comprises microalgal strains selected from: *Ankistrodesmusfalcatus, Scenedesmus* spp., *Fragilaria construens, Nitzschia* spp., *Scendesmus dimorphus, Ulothrix* spp., *Synedra ulna, Merismopedia tenuissima*, and *Peridinium* spp.

39. A method, as claimed in claim 38, wherein at least about 70% of the biomass in said assemblage consists of microalgae consisting of *Micractinluin pusillum* and *Carteria* spp.

40. A method, as claimed in claim 38, wherein at least about 80% of the biomass in said assemblage consists of microalgae consisting of *Micractinium pusillum* and *Carteria* spp.

41. A method of remediating waste, said method comprising delivering an assemblage of microalgae to a waste site to be remediated, to produce aerobic remediation within the waste site by interaction of the microalgae which consumes the waste and produces oxygen, wherein at least about 80% of the biomass in said assemblage consists of microalgae from the division *Chlorophyta*, and wherein the remainder of the biomass in said assemblage comprises microalgal strains from *Chlorophyta, Baccillariophyta*, and *Pyrrhophyta*.

42. A method, as claimed in claim 41, wherein the remainder of the biomass in said assemblage comprises microalgae from *Chlorophyta, Baccillanophyta, Euglenophyta, Cryptophyta, Chrysophyta*, and *Pyrrophyta*.

43. A method, as claimed in claim 41, wherein the assemblage comprises no members of *Cyanophyta*.

44. A method, as claimed in claim 41, wherein the assemblage comprises at least one genus of microalgae selected from the group consisting of *Micractinium, Carteria, Ankistrodesmus, Scenedesmus, Ulothrix, Dictyosphaeriutn, Chlorococcaceae. Golenkinia, Cosmarium, Dimorphococcus, Pediastrum, Stigeoclonium, Chiamydomonas, Era gilaria, Navicula, Nizschia, Synedra, Pseudanabaena, Lyngbya, Mensmopedia, Oscillatoria* and *Peridinium*.

45. A method, as claimed in claim 41, wherein said at least about 80% of the biomass comprises at least one genus from the division Chlorophyta selected from the group consisting of: *Micractinium, Carteria, Ankistrodesm us, Scenedesmus, Ulothrix, Dictyosphaerium, Chlorococcaceae, Golenkinia, Cosmarium, Dimorphococcus, Pediastrum, Stigeoclonium, Chiamydomonas, Pandorina*, and *Monoraphidium* species.

46. A method, as claimed in claim 45, wherein the remainder of the biomass in said assemblage comprises microalgal strains selected from the group consisting of: *Ankistrodesmus, Scenedesmus, Fragilaria, Nitzschia, Navicula, Achnanthes, Amphora, Gomphonema, Ulothrix, Synedra, Merismopedia, Lyngbya, Oscillatoria, Chroococcus, Pseudanabaena, Peridinium* and *Gymnodinium*.

47. A system for remediating waste comprising:

a structure having an exterior made of translucent material allowing sunlight to pass therethrough;

at least one production tank positioned within the structure, said production tank having a predetermined volume of water therein set at a desired temperature range;

a first line for delivering nutrients to the tank for nourishing a culture of microorganisms placed in the tank for culturing;

a temperature monitor communicating with the tank for monitoring the temperature of the water; and a second line communicating with the production tank for delivering the culture to a waste site for remediation of the waste site.

48. A method of remediating waste, said method incorporated within a system of remediation, said method comprising the steps of:

providing at least one production tank with water therein set at a desired temperature range;

introducing a microbial culture into said production tank;

introducing nutrients into the production tank for growing the culture;

controlling heat and light conditions to optimize growth of the culture within the tank;

monitoring oxygen levels within the tank for optimizing growth of the culture;

delivering the culture to a waste site to be remediated, said production tank being placed adjacent the waste site at a convenient location;

continuing to replenish water and nutrients in the culture tank thereby maintaining a viable population of the microorganisms within the culture tank;

continuing to deliver the culture to the waste site at a desired steady rate according to the remediation requirements for the waste site and the capacity of the production tank; and producing aerobic remediation within the waste site by interaction of the culture which consumes the waste and produces oxygen.

49. A system for remediating waste comprising:

a structure having an exterior made of translucent material allowing sunlight to pass therethrough;

at least one production tank positioned within the structure, said production tank having a predetermined volume of water therein and set at a desired temperature range;

a line for delivering water to the at least one production tank, said line including an inline heater for heating the water delivered to the production tank in order to maintain the water in the tank at the desired temperature range;

a microorganism placed in the production tank, said microorganism comprising a remediating culture to be delivered to the waste site for remediation of the waste site wherein the production tank and the nutrients delivered thereto provide a medium for growth and colonization of the microorganism;

means communicating with the production tank for delivering the culture to the waste site; and an artificial light source placed within the structure to provide additional light as required for optimum growth of the culture.

50. A system for remediating waste comprising:

a structure having an exterior made of translucent material allowing sunlight to pass therethrough;

at least one production tank positioned within the structure, said production tank having a predetermined volume of water therein set at a desired temperature range;

a first line for delivering nutrients to the tank for nourishing a culture of microorganismS placed in the tank for culturing, said microorganisms comprising selected species of microalgae;

a temperature monitor communicating with the tank for monitoring the temperature of the water; and a second line communicating with the production tank for delivering the culture to a waste site for remediation of the waste site.

* * * * *

UNITED STATES PATENT AND TRADEMARK OFFICE
CERTIFICATE OF CORRECTION

PATENT NO. : 6,896,804 B2
DATED : May 24, 2005
INVENTOR(S) : Daryl W. Haerther

It is certified that error appears in the above-identified patent and that said Letters Patent is hereby corrected as shown below:

Column 3,
Line 64, delete "Chloella" and insert -- Chlorella -- therein.

Column 4,
Line 6, delete "Chloella" and insert -- Chlorella -- therein.

Column 13,
Line 24, delete "Chloella" and insert -- Chlorella -- therein.

Column 15,
Line 5, delete "shilol" and insert -- shiloi -- therein.

Column 25,
Line 46, delete "Chiorophyta" and insert -- Chlorophyta -- therein.

Column 27,
Line 59, delete "Micractiniumpusillum" and insert -- Micractinium pusillum -- therein.
Line 62, delete "Ankistrodesmusfalcatus" and insert -- Ankistrodesmus falcatus -- therein.

Column 28,
Line 1, delete "niicroalgae" and insert -- microalgae -- therein.
Line 5, delete "Micractiniumpussillum" and insert -- Micractinium pussillum -- therein.
Line 15, delete "Ankistrodesmusfalcatus" and insert -- Ankistrodesmus falcatus -- therein.
Line 21, delete "Micractinluin" and insert -- Micratinium -- therein.
Line 39, delete "Baccillanophyta" and insert -- Baccillariophyta -- therein.
Line 47, delete "Dictyosphaeriutn" and insert -- Dictyosphaerium -- therein.
Line 47, delete "Chlorococcaceae." and insert -- Chlorococaceae, -- therein.
Line 49, delete "Era gilaria," and insert -- Eragilaria, -- therein.
Line 50, delete "Mensmopedia," and insert -- Merismopedia, -- therein.
Line 55, delete "Ankistrodesm us," and insert -- Ankistrodesmus, -- therein.
Line 58, delete "Chiamydomonas" and insert -- Chlamydomonas -- therein.

UNITED STATES PATENT AND TRADEMARK OFFICE
CERTIFICATE OF CORRECTION

PATENT NO. : 6,896,804 B2
DATED : May 24, 2005
INVENTOR(S) : Daryl W. Haerther

It is certified that error appears in the above-identified patent and that said Letters Patent is hereby corrected as shown below:

Column 30,
Line 33, delete "microorganismS" and insert -- microorganisms -- therein.

Signed and Sealed this

Sixteenth Day of August, 2005

JON W. DUDAS
*Director of the United States Patent and Trademark Office*